US011433997B2

(12) United States Patent
Acee et al.

(10) Patent No.: US 11,433,997 B2
(45) Date of Patent: Sep. 6, 2022

(54) ROTORCRAFT ANTI-TORQUE SYSTEMS AND METHODS THEREFOR

(71) Applicant: Bell Helicopter Textron Inc., Fort Worth, TX (US)

(72) Inventors: Aaron A. Acee, Flower Mound, TX (US); Albert G. Brand, North Richland Hills, TX (US); Frank B. Stamps, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 984 days.

(21) Appl. No.: 16/399,015

(22) Filed: Apr. 30, 2019

(65) Prior Publication Data

US 2020/0023958 A1 Jan. 23, 2020

Related U.S. Application Data

(63) Continuation-in-part of application No. 15/796,910, filed on Oct. 30, 2017, now Pat. No. 10,940,945.

(51) Int. Cl.
*B64C 27/82* (2006.01)
*B64C 13/50* (2006.01)
*B64C 13/04* (2006.01)

(52) U.S. Cl.
CPC ............ *B64C 27/82* (2013.01); *B64C 13/044* (2018.01); *B64C 13/503* (2013.01);
(Continued)

(58) Field of Classification Search
CPC ............ B64C 27/82; B64C 2027/8209; B64C 2027/8227; B64C 2027/8254; B64C 27/12
See application file for complete search history.

(56) References Cited

U.S. PATENT DOCUMENTS 2,415,622 A 2/1947 Bossi
7,731,121 B2 6/2010 Smith et al.
(Continued)

FOREIGN PATENT DOCUMENTS

EP 2610176 A1 3/2013
EP 3254962 A1 12/2017
(Continued)

OTHER PUBLICATIONS

NTSB's Probable Cause on Fatal EC135 Crash Blames CFIT, Other Factors; http://www.aero-news.net/index.cfm?do-main.textpost&id=48cc1b01-f801-4ec9-b607-ddcb3eab1389; Dec. 26, 2007.
(Continued)

*Primary Examiner* — Magdalena Topolski
(74) *Attorney, Agent, or Firm* — Timmer Law Group, PLLC

(57) ABSTRACT

A method of providing an anti-torque force in a rotorcraft with an anti-torque system comprised of a primary ducted tail rotor system mechanically connected to an engine, and a secondary ducted tail rotor system electrically connected to an electric power supply. The method includes receiving an indication of a change in the operating condition of the anti-torque system based upon a change in a rotorcraft condition input, a feedback input associated with a primary ducted tail rotor system and/or a secondary ducted tail rotor system, and/or a pilot input; responsive to the indication of the change, determining, by a control system, an anti-torque control input including at least a secondary output command for controlling the secondary ducted tail rotor system; and transmitting the secondary output command to the secondary ducted tail rotor system to energize at least one ducted tail rotor assembly therein to provide the second anti-torque force.

18 Claims, 17 Drawing Sheets

(52) U.S. Cl.
CPC .............. *B64C 2027/8209* (2013.01); *B64C 2027/8227* (2013.01); *B64C 2027/8254* (2013.01)

(56) References Cited

U.S. PATENT DOCUMENTS

| | | | |
|---|---|---|---|
| 8,590,827 | B2 | 11/2013 | Sparks |
| 8,636,242 | B2 | 1/2014 | Smith |
| 8,640,984 | B2 | 2/2014 | Kebrle et al. |
| 8,840,058 | B2 | 9/2014 | Brand et al. |
| 8,882,024 | B1 | 11/2014 | McCollough et al. |
| 8,960,599 | B2 | 2/2015 | Edwards et al. |
| 8,989,921 | B2 | 3/2015 | Nannoni et al. |
| 9,026,274 | B2 | 5/2015 | Hartman et al. |
| 9,174,728 | B2 | 11/2015 | Altmikus et al. |
| 9,216,816 | B2 | 12/2015 | Fortenbaugh et al. |
| 9,584,086 | B2 | 2/2017 | McCollough et al. |
| 9,645,582 | B2 | 5/2017 | Shue |
| 9,870,004 | B2 | 1/2018 | Atkins et al. |
| 10,040,566 | B2 | 8/2018 | Waltner |
| 10,814,970 | B2 * | 10/2020 | Sinusas ................. B64C 27/82 |
| 10,940,945 | B2 | 3/2021 | Hefner et al. |
| 2006/0049304 | A1 | 3/2006 | Sanders, Jr. et al. |
| 2009/0014581 | A1 | 1/2009 | Kebrle et al. |
| 2009/0140095 | A1 | 6/2009 | Sirohi et al. |
| 2011/0121128 | A1 | 5/2011 | Balkus, Jr. |
| 2013/0032664 | A1 | 2/2013 | Kebrle et al. |
| 2013/0134256 | A1 | 5/2013 | Gaillard |
| 2014/0191079 | A1 | 7/2014 | Ehinger et al. |
| 2014/0374534 | A1 | 12/2014 | McCollough et al. |
| 2015/0001337 | A1 | 1/2015 | McCollough et al. |
| 2015/0246726 | A1 | 9/2015 | Pongratz et al. |
| 2016/0200430 | A1 | 7/2016 | Dickman et al. |
| 2017/0349274 | A1 | 12/2017 | Fenny et al. |
| 2017/0349276 | A1 | 12/2017 | Fenny |
| 2017/0355448 | A1 | 12/2017 | Fortenbaugh |
| 2018/0178908 | A1 | 6/2018 | Taheri |
| 2019/0127059 | A1 | 5/2019 | Hefner et al. |
| 2019/0329876 | A1 | 10/2019 | Burnetti |
| 2020/0385112 | A1 * | 12/2020 | Brunetti ................. B64C 27/14 |

FOREIGN PATENT DOCUMENTS

| | | | | |
|---|---|---|---|---|
| EP | 3363741 | A1 | 8/2018 | |
| EP | 3476731 | A1 | 5/2019 | |
| EP | 3476731 | B1 | 2/2020 | |
| EP | 3733509 | A1 | 4/2020 | |
| GB | 2468787 | A | 9/2010 | |
| JP | 2009090755 | A | 4/2009 | |
| WO | WO-2009108178 | A2 * | 9/2009 | ............ B64C 27/10 |
| WO | 2011062783 | A2 | 5/2011 | |
| WO | 2011062783 | A3 | 5/2011 | |

OTHER PUBLICATIONS

EP Search Report, dated Mar. 6, 2019, by the EPO, re EP Patent App No. 18201186.6.
EP Exam Report, dated Mar. 19, 2019, by the EPO, re EP Patent App No. 18201186.6.
EP Exam Report, dated Oct. 22, 2019, by the EPO, re EP Patent App No. 18201186.6.
Office Action, dated Sep. 19, 2019, by the USPTO, re U.S. Appl. No. 15/796,910.
Communication under Rule 71(3) EPC—Intent to Grant, dated Jun. 4, 2020, by the EPO, re EP Patent App No. 18201186.6.
EP Search Report, dated Sep. 25, 2020, by the EPO, re EP App No. 20166915.7.
Exam Report, dated Oct. 14, 2020, by the EPO, re EP App No. 20166915.7.
Notice of Allowance, dated Nov. 5, 2020, by the USPTO, re U.S. Appl. No. 15/796,910.
Final Office Action, dated Feb. 12, 2020, by the USPTO, re U.S. Appl. No. 15/796,910.
EP Exam Report, dated Mar. 17, 2021, by the EPO, re EP Application No. 20166915.7.

* cited by examiner

ROTORCRAFT ANTI-TORQUE SYSTEMS AND METHODS THEREFOR

CROSS-REFERENCE TO RELATED APPLICATION

This application claims priority to and is a continuation-in-part patent application of U.S. patent application Ser. No. 15/796,910, filed Oct. 30, 2017, which is hereby incorporated by reference for all purposes as if fully set forth herein.

TECHNICAL FIELD

The present disclosure relates to rotorcraft anti-torque systems and, more particularly, to aircraft power systems, components thereof, and features and methods relating thereto.

DESCRIPTION OF RELATED ART

A traditional rotorcraft, such as a helicopter, includes one main rotor system to generate aerodynamic lift to support the weight of the rotorcraft in flight and thrust to counteract aerodynamic drag and move the rotorcraft in forward flight. A tail rotor system is typically included to generate thrust in the same direction as the main rotor system's rotation to counter the torque effect created by the main rotor system. The tail rotor system can fail due to hard landings, tail strikes, foreign objections, and/or wear and tear of components therein.

The rotorcraft can produce significant sound from the engine and transmission as well as from compression waves generated by the passing of each rotor blade. Shrouded tail rotors (due to their smaller diameter, higher rotational speed, and larger number of blades) produce a higher frequency noise (compared to a conventional open tail rotor, e.g., blades are not within a duct or shroud). The high frequency noise is easily detectable by humans. Moreover, a conventional shrouded tail rotor is heavy due to the significant structure needed to maintain gap tolerances between the rotating blades and shroud components. Thus, a need remains for improving the design, operation, and acoustic signature of shrouded tail rotors.

There is a need for improved anti-torque systems and methods that provide anti-torque force in a rotorcraft.

SUMMARY

In a first aspect, there is a method of providing an anti-torque force in a rotorcraft; the rotorcraft having an anti-torque system comprised of a primary ducted tail rotor system mechanically connected to an engine and configured to provide a first anti-torque force on the body of the rotorcraft, and a secondary ducted tail rotor system electrically connected to an electric power supply and configured to provide a second anti-torque force on the body of the rotorcraft; the method comprising: receiving an indication of a change in the operating condition of the anti-torque system based upon a change in at least one of the following: a rotorcraft condition input from a rotorcraft condition sensor, a feedback input from at least one feedback sensor associated with a primary ducted tail rotor system and/or a secondary ducted tail rotor system, and a pilot input from at least one pilot control; responsive to the indication of the change in the operating condition of the anti-torque system, determining, by a control system, an anti-torque control input including at least a secondary output command for controlling the secondary ducted tail rotor system; and transmitting the secondary output command to the secondary ducted tail rotor system to energize at least one ducted tail rotor assembly therein to provide the second anti-torque force.

In an embodiment, the step of determining an anti-torque control input including at least a secondary output command is determined by at least one of the following: an auxiliary loop, a primary malfunction loop, a secondary malfunction loop, and an acoustic signature loop.

In another embodiment, the control system is a fly-by-wire flight system.

In some embodiments, the at least one pilot control comprises a pedal assembly including a pedal and a pedal sensor operably associated with the pedal and configured to detect displacement of the pedal; wherein the indication of a change in the operating condition comprises sensing displacement of the pedal by the pedal sensor.

In yet another embodiment, the pedal is configured to be positioned to a first position to indicate a change in the operating condition of the primary ducted tail rotor system and a second position to indicate a change in the operating condition in the secondary ducted tail rotor system.

In still another embodiment, the method further comprises the step of determining an anti-torque control input including at least the secondary output command is achieved by implementing an auxiliary loop to generate the secondary output command.

In an embodiment, the auxiliary loop determines a current anti-torque system performance based on rotorcraft condition input from the rotorcraft condition sensors and determines a desired second anti-torque force based upon the displacement of the pedal, which are then used to determine an appropriate action of the at least one ducted tail rotor assembly to achieve the desired amount of second anti-torque force; wherein the secondary output command is determined and generated in accordance with the determined appropriate action of the at least one ducted tail rotor assembly.

In an exemplary embodiment, the change in the operating condition comprises sensing a malfunction, a pending malfunction, or loss of the primary ducted tail rotor system, the method further comprising: the step of determining an anti-torque control input including at least the secondary output command is achieved by implementing a primary malfunction loop to generate the secondary output command.

In still another embodiment, the primary malfunction loop determines a primary ducted tail rotor system performance and determines a desired second anti-torque force based upon the rotorcraft condition input, a feedback input, and/or the pilot input, which is then used to determine an appropriate action of the at least one ducted tail rotor assembly to achieve the desired second anti-torque force; wherein the secondary output command is determined and generated in accordance with the determined appropriate action of the at least one ducted tail rotor assembly.

In an embodiment, the secondary ducted tail rotor system comprises a first ducted tail rotor assembly and a second ducted tail rotor assembly, wherein the change in operating condition is comprised of sensing a malfunction, a pending malfunction, or loss of the first or second ducted tail rotor assembly, the method further comprising: the step of determining an anti-torque control input including at least the secondary output command is achieved by implementing a secondary malfunction loop to generate the secondary output command for controlling a functioning first or second ducted tail rotor assembly.

In still another embodiment, the secondary malfunction loop determines a current secondary ducted tail rotor system performance and determines a desired second anti-torque force based upon the rotorcraft condition input, a feedback input, and/or the pilot input, which is then used to determine an appropriate action of the functioning first or second ducted tail rotor assembly to achieve the desired second anti-torque force; wherein the secondary output command is determined and generated in accordance with the determined appropriate action of the functioning first or second ducted tail rotor assembly.

In yet another embodiment, the method further comprises augmenting the second anti-torque force provided by the functioning first or second ducted tail rotor assembly to align the second anti-torque force provided by the functioning first or second ducted tail rotor assembly with the desired anti-torque system performance.

In an embodiment, wherein the change in the operating condition comprises determining a noise-sensitive area, the method further comprising: the step of determining an anti-torque control input is achieved by implementing an acoustic signature loop to generate a primary output command and the secondary output command to achieve a desired acoustic signature of the anti-torque system.

In an exemplary embodiment, the determining of a noise-sensitive area and the desired acoustic signature is based on at least one of the following: current anti-torque system acoustic signature are each based upon the rotorcraft condition input, a feedback input, and/or the pilot input, which is then used to determine an appropriate action of the at least one ducted tail rotor assembly to achieve the desired acoustic signature; wherein the secondary output command is determined and generated in accordance with the determined appropriate action of the at least one ducted tail rotor assembly.

In yet another embodiment, the step of determining an appropriate action further comprises determining an appropriate action of the primary ducted tail rotor system to achieve the desired acoustic signature and generate a primary output command in accordance with the determined appropriate action of the primary ducted tail rotor system.

In still another embodiment, when entering a noise-sensitive area, the secondary output command increases a rpm and/or a collective of the blades in at least one ducted tail rotor assembly in the secondary ducted tail rotor system and the primary output command decreases a rpm and/or a collective of the blades in the primary ducted tail rotor system.

In an exemplary embodiment, the acoustic signature loop further comprises sending an acoustic signature output including at least one of a current acoustic signature display and a desired acoustic signature display to an output interface.

In an embodiment, the desired acoustic signature is selected from a database having a plurality of predetermined acoustic signatures.

In an illustrative embodiment, the acoustic signature loop is automatically implemented when the rotorcraft is in or near a noise-sensitive area.

In yet another embodiment, the determining of a noise-sensitive area and the desired acoustic signature is based on the pilot input including a primary input and a secondary input, which is then directly transmitted to the control system for determining at least a secondary output command and a primary output command.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of rotorcraft anti-torque systems and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

This disclosure depicts and describes anti-torque systems for rotorcraft and methods relating thereto. The embodiments of the anti-torque systems and methods relating thereto will be described with reference to rotorcraft 100. The anti-torque systems and methods relating thereto depicted and/or described herein can be used with any aircraft having one or more rotor assemblies, including tiltrotor aircrafts, helicopters, autogyros, tilt wing aircrafts, unmanned aerial vehicles (UAVs), hovercrafts, and other vertical lift or VTOL aircrafts, or can further be used with any device having one or more components having rotor assemblies. Further, any features of one embodiment of the anti-torque systems and methods relating thereto in this disclosure can be used with any other embodiment of the anti-torque systems and methods such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Figure 1A:
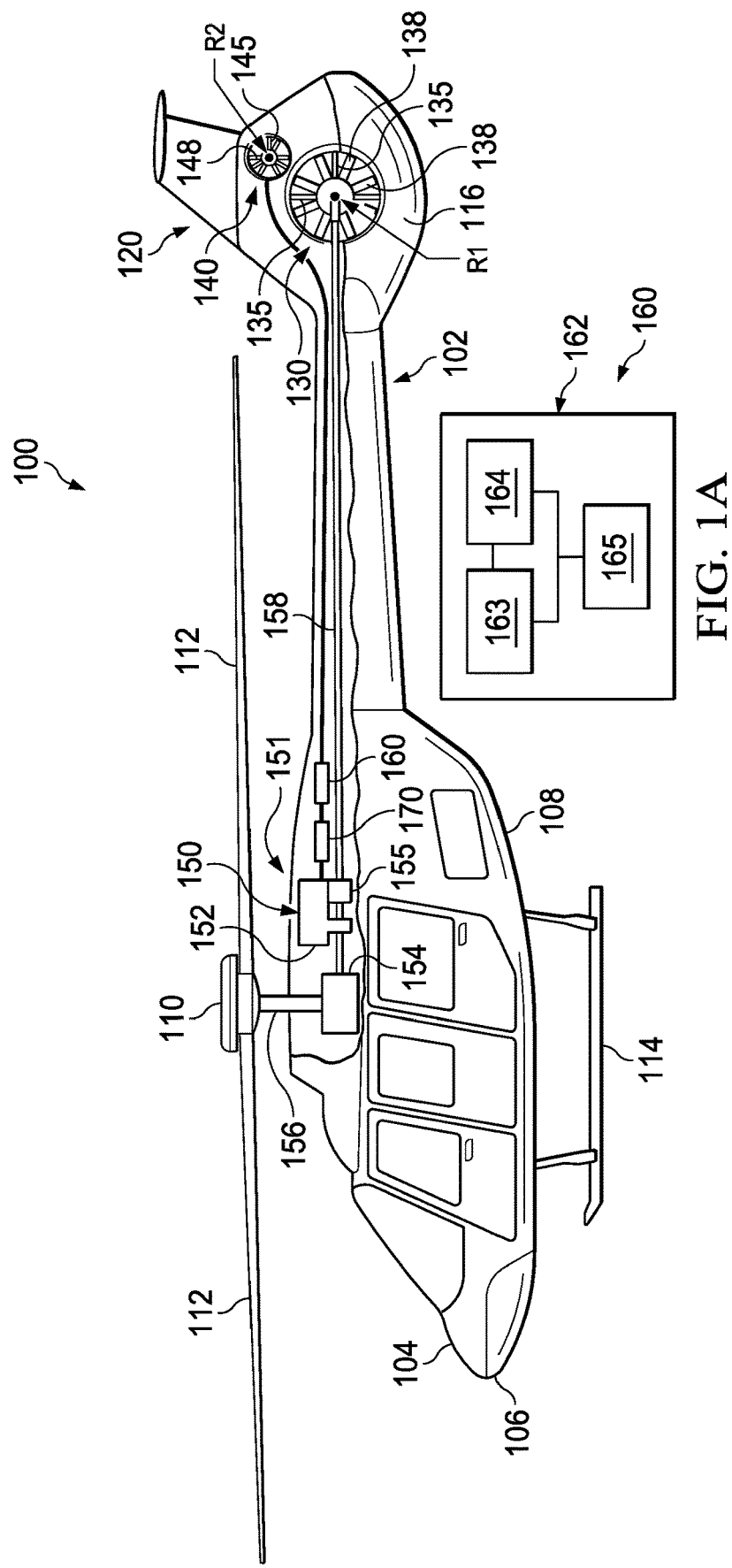
FIG. 1A shows a partial cut-away side view of a rotorcraft, according to one example embodiment.

FIG. 1A is a schematic representation of a rotorcraft, generally shown as 100, including a tail portion 102 which embodies the principles of the present invention. The rotorcraft 100 includes a body 104 with a front portion 106 and a tail portion 102. The body 104 includes a fuselage 108 in the front portion 106. Fuselage 108 can be coupled to the main rotor system 110 and blades 112 such that the main rotor system 110 and blades 112 may move the rotorcraft 100 through the air. Landing gear 114 supports rotorcraft 100 when rotorcraft 100 is landing and/or when rotorcraft 100 is on the ground.

Figure 1B:
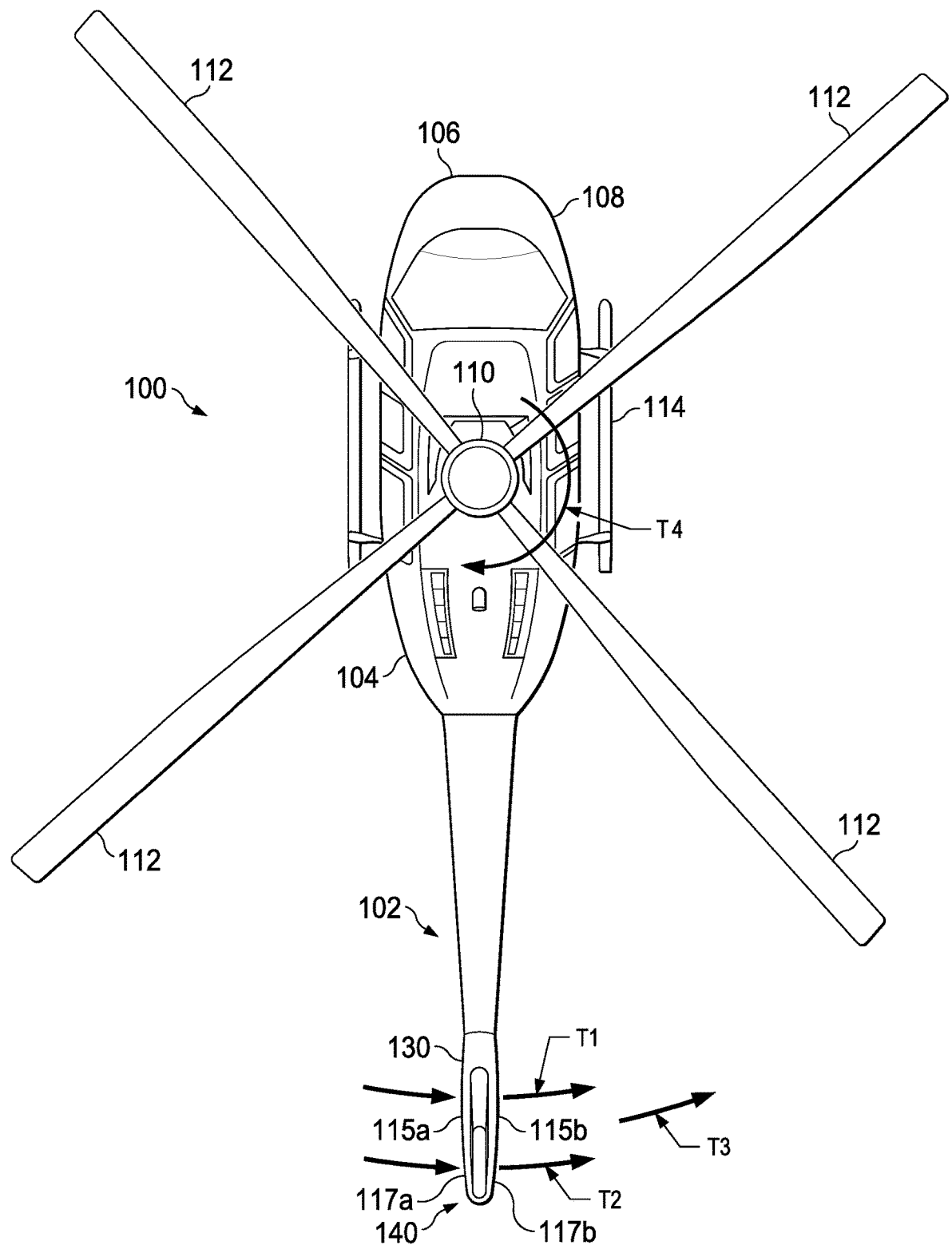
FIG. 1B shows a top view of the rotorcraft of FIG. 1A.
Figure 1C:
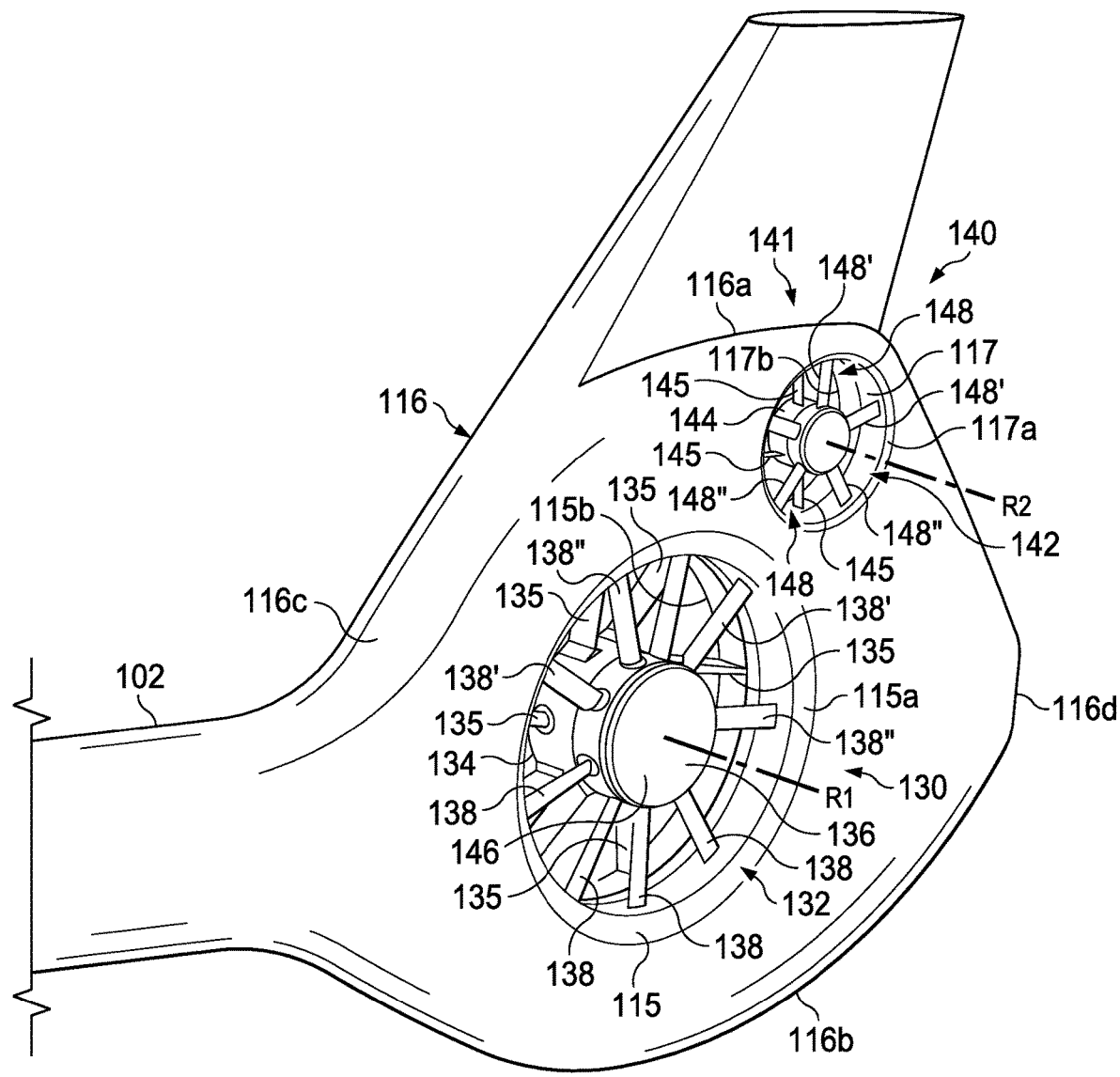
FIG. 1C shows a perspective view of the rotorcraft of FIG. 1A.
Figure 4:
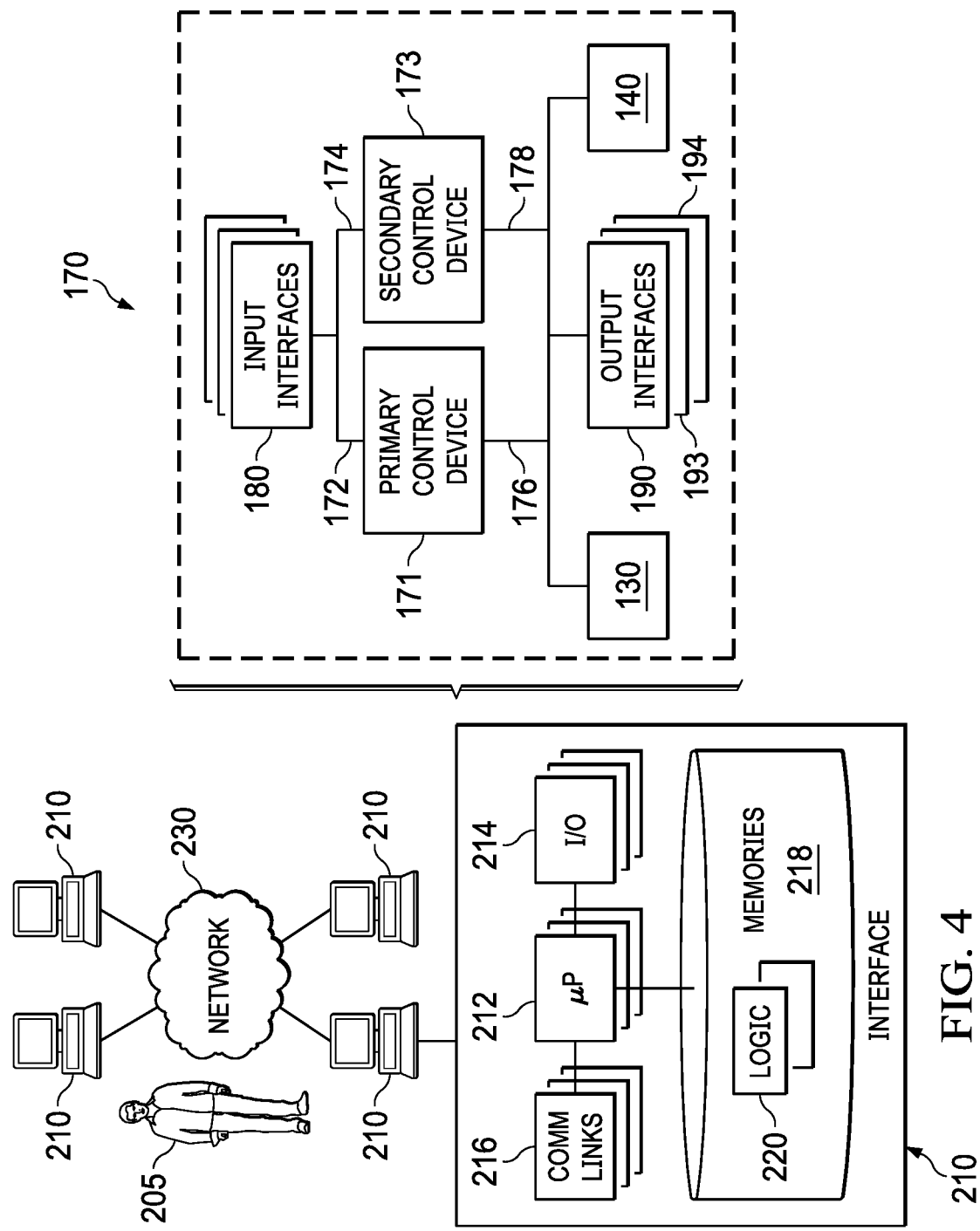
FIG. 4 shows illustrates a block diagram of a computer system associated with a control system, according to an exemplary embodiment.

Referring to FIGS. 1A-1C, the tail portion 102 includes an anti-torque system 120 associated therewith. In an embodiment, the anti-torque system 120 includes a primary ducted tail rotor system 130, a secondary ducted tail rotor system 140, and a control system 170 that communicates with a computer system 210 (as shown in FIG. 4). In some embodiments, the primary ducted tail rotor system 130 can provide the majority of the anti-torque force. The secondary ducted tail rotor system 140 can provide additional anti-torque force and/or additional redundancy for safety. The anti-torque system 120 can be supported within ducts that extend transversely through shroud 116 of the tail portion 102. This type of anti-torque system 120 can be referred to as a shrouded tail rotor (or fantail). The shroud 116 can include a top region 116a, a bottom region 116b, a leading edge region 116c, and a trailing edge region 116d. The shroud 116 includes a primary duct 115 and a secondary duct 117 that are each generally annular in shape. Each of the primary and secondary ducts 115, 117 include a leading edge 115a, 117a and a trailing edge 115b, 117b. During operation of the anti-torque system 120, air is drawn from the leading edge 115a, 117a by the respective primary and secondary ducted tail rotor system 130, 140 and exits at the trailing edge 115b, 117b.

The primary ducted tail rotor system 130 is disposed in primary duct 115 and includes a rotor 132 and a stator 134 downstream of the rotor 132. The rotor 132 is rotatably mounted within primary duct 115 and includes a hub 136 and blades 138. The rotor 132 is mounted for rotation about a first axis R1 that is substantially coaxial with the axis of the primary duct 115. The rotor 132 can include any suitable number of blades 138 (e.g., seven blades 138 as illustrated in FIG. 1A). The blades 138 can be collectively controlled such that the pitch angle of each blade can be adjusted during operation. During operation, blades 138 in the primary ducted tail rotor system 130 can generate a first anti-torque force T1.

Stator 134 is fixedly mounted within primary duct 115 and includes a hub and a plurality of fixed vanes 135 that extend from the hub to the secondary duct 115. Stator 134 can include any suitable number of fixed vanes 135, e.g., equal to or unequal to the number of rotor blades 138.

The primary ducted tail rotor system 130 can be powered by a first power system 150. First power system 150 can be a conventional powertrain system 151 coupled to the body 104 as shown in FIG. 1A. Power train system 151 can include an engine 152, a gearbox 154, a main rotor mast 156, a tail rotor transmission 155 and a tail rotor drive shaft 158. Engine 152 supplies torque to the main rotor mast 156 via gearbox 154 for rotating of blades 112. Engine 152 also supplies torque to tail rotor drive shaft 158 via transmission 155 for rotating of blades 138 of the primary ducted tail rotor system 130. Power train system 151 may include a collective control system for selectively controlling the pitch of the blades 138 in order to selectively control direction and thrust of the anti-torque system 120. It should be appreciated that the first power system 150 may take on a wide variety of configurations dependent upon the size and arrangement of the rotorcraft 100. For example, first power system 150 can be a hydraulic power system including a hydraulic pump and fluid reservoir or other power system.

In some embodiments, the blades 138 of the primary ducted tail rotor system 130 can include a plurality of variable pitch secondary blades 138'. The pitch angle of the plurality of variable pitch primary blades 138' can be adjusted during operation. The plurality of variable pitch primary blades 138' can be rotated by the first power system 150 at a primary speed to generate anti-torque thrust T1. In some embodiments, the primary speed can be rotated at a constant speed. In other embodiments, the primary speed can be a variable speed (variable RPM).

In another embodiment, the blades 138 of the primary ducted tail rotor system 130 can include a plurality of fixed pitch primary blades 138". The plurality of fixed pitch primary blades 138" can be rotated by the first power system 150 at a primary speed to generate anti-torque thrust T1. In a preferred embodiment, the primary speed is a variable speed (variable RPM).

The secondary ducted tail rotor system 140 is disposed in a secondary duct 117 and includes at least one ducted tail rotor assembly 141 including a rotor 142 and a stator 144 downstream of the rotor 142. The rotor 142 is rotatably mounted within secondary duct 117 and includes a hub 146 and blades 148. The rotor 142 is mounted for rotation about a second axis R2 that is substantially coaxial with the axis of the secondary duct 117. The second axis R2 of the secondary ducted tail rotor a system 140 is substantially parallel and non-coaxial with respect to the first axis R1 in the primary ducted tail rotor system 130. The rotor 142 can include any suitable number of blades 148 (e.g., six blades 148 as illustrated in FIG. 1A). The blades 148 can be fixed pitch or collectively controlled such that the pitch angle of each blade can be adjusted during operation. In an embodiment, the blades 148 are only fixed pitched, which can advantageously reduce the weight of the anti-torque system 120. During operation, blades 148 in the secondary ducted tail rotor system 140 can generate a second anti-torque force T2.

The stator 144 is fixedly mounted within secondary duct 117 and includes a hub and a plurality of fixed vanes 145 that extend from the hub to the secondary duct 117. The stator 144 can include any suitable number of fixed vanes 145, e.g., equal to or unequal to the number of rotor blades 148.

The secondary ducted tail rotor system 140 can be operated by a second power system 160. Second power system 160 can be an electrical power supply 162, as shown in FIG. 1A. The electrical power supply 162 can be produced from multiple power sources, such as generators, batteries, auxiliary power units (APUs) and/or other power sources that supply power interchangeably or not interchangeably to various electrical components of the rotorcraft 100. In an embodiment, the electrical power supply 162 can include an electric generator 163, a battery 164, and a fuel cell 165 being conductively connected to the secondary ducted tail rotor system 140 to rotate the blades 148 therein. The electrical power supply 162 may include a collective control system for selectively controlling the pitch of the blades 148 in order to selectively control direction and thrust of the anti-torque system 120. It should be appreciated that the second power system 160 may take on a wide variety of configurations dependent upon the size and arrangement of the rotorcraft 100.

The secondary ducted tail rotor system 140 can include at least one tail rotor assembly 141 as shown in FIGS. 1A-1C. The ducted tail rotor assembly 141 can be a first tail rotor assembly disposed generally in top region 116a of shroud 116. In some embodiments, as shown in FIGS. 1A-1C, the first tail rotor assembly 141 has a diameter less than the diameter of the primary ducted tail rotor system 130.

In some embodiments, the blades 148 of the secondary ducted tail rotor system 140 can include a plurality of variable pitch secondary blades 148'. The pitch angle of the plurality of variable pitch secondary blades 148' can be adjusted during operation. The plurality of variable pitch secondary blades 148' can be rotated by the second power system 160 at a secondary speed to generate the anti-torque thrust T2. In some embodiments, the secondary speed can be rotated at a constant speed. In other embodiments, the secondary speed can be a variable speed (variable RPM).

In another embodiment, the blades 148 of the secondary ducted tail rotor system 140 can include a plurality of fixed pitch secondary blades 148". The plurality of fixed pitch secondary blades 148" can be rotated by the second power system 160 at a secondary speed to generate the anti-torque thrust T2. In a preferred embodiment, the secondary speed is a variable speed (variable RPM).

Figure 2:
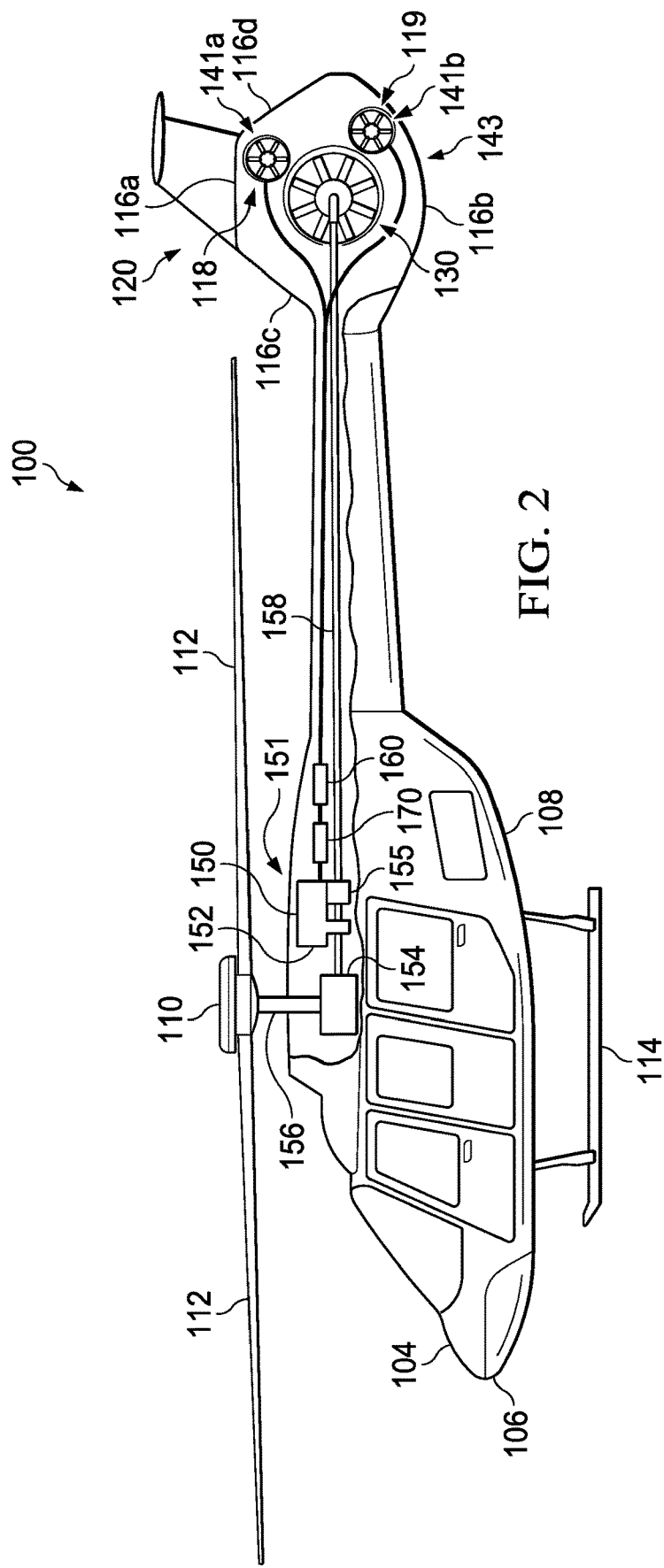
FIG. 2 shows a partial cut-away side view of a rotorcraft, according to an exemplary embodiment.
Figure 3:
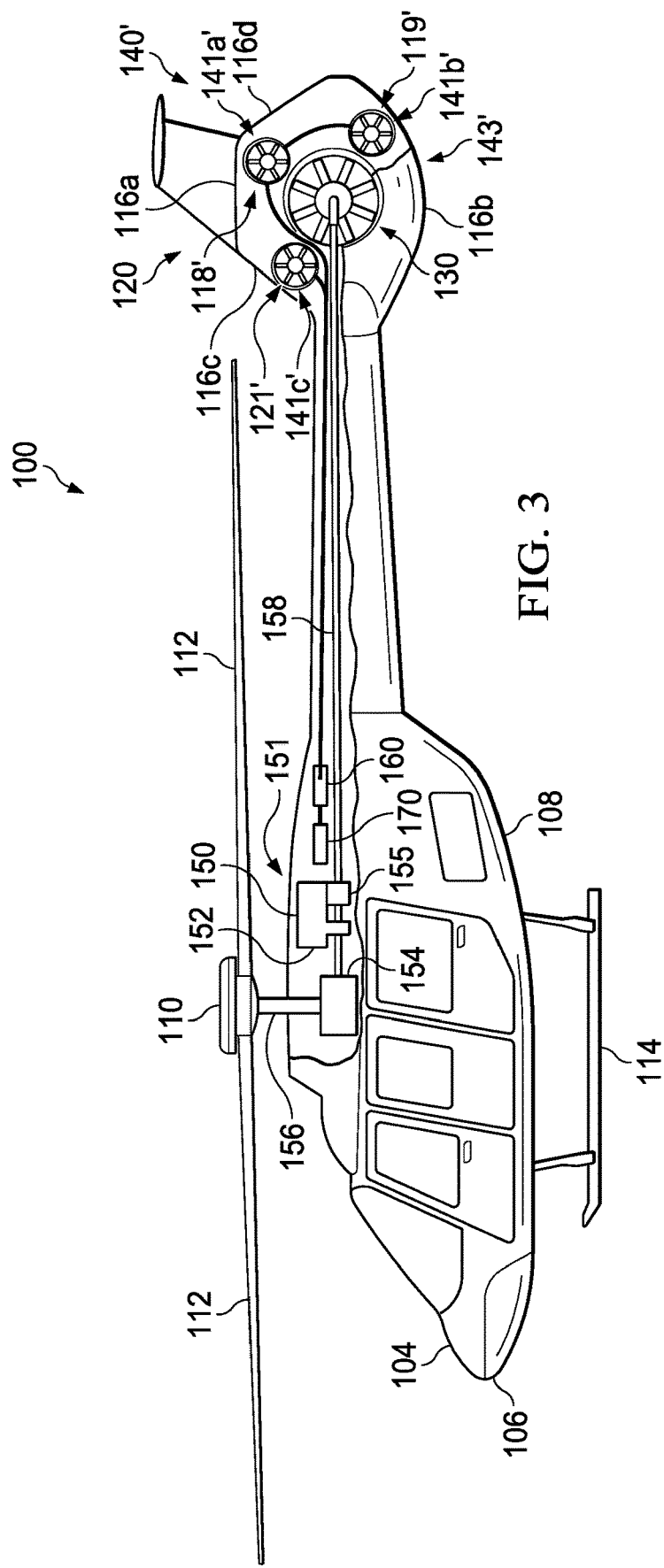
FIG. 3 shows a partial cut-away side view of a rotorcraft, according to one example embodiment.

In another exemplary embodiment, referring now to FIGS. 2-3, the secondary ducted tail rotor system 140 can include additional ducted tail rotor assemblies 141. For example, the secondary ducted tail rotor system 140 can include a plurality of ducted tail rotor assemblies 141. As shown in FIG. 2, the plurality of tail rotor assemblies 143 can include a first ducted tail rotor assembly 141a and a second ducted tail rotor assembly 141b to provide additional anti-torque force and/or additional redundancy for safety. The first and second ducted tail rotor assemblies 141a and 141b are disposed in a third duct 118 and fourth duct 119, respectively. The first ducted tail rotor assembly 141a is disposed in the top region 116a of the shroud 116. The second ducted tail rotor assembly 141b is disposed in the bottom region 116b of the shroud 116. In this exemplary embodiment, both the first and second ducted tail rotor assemblies are disposed in the trailing edge region 116d of the shroud 116. In another exemplary embodiment, as shown in FIG. 3, like features of the plurality of ducted tail rotor assemblies 143' are identified by like numerals with a primed suffix ('), the plurality of tail rotor assemblies 143' includes a first ducted tail rotor assembly 141a', a second ducted tail rotor assembly 141b', and a third ducted tail rotor assembly 141c' to provide even more additional anti-torque force and/or additional redundancy for safety. The third ducted tail rotor assembly 141c' is disposed in fourth duct 121'. The third tail rotor assembly 141c' is disposed in the leading edge region of the shroud 116. It will be appreciated that the secondary ducted tail rotor system 140 may take on a wide variety of configurations (e.g., the number of tail rotor assemblies 141, the arrangement of the tail rotor assemblies 141, the size of the tail rotor assemblies, the power source of the tail rotor assemblies 141, the components of the tail rotor assembly 141) that are sufficient to provide additional anti-torque force and/or provide redundancy for safety for various rotorcraft.

As shown in the example of FIG. 1B, when main rotor blades 112 rotate to create a first lifting force, body 104 counters with a torque T4 in the direction opposite to the rotational direction of the blades 112. The anti-torque system 120 can generate a total anti-torque force (or torque T3) in a direction opposite to that of T4 by, for example, rotating blades 138 in the primary ducted tail rotor system 130 and/or rotating blades 148 in the secondary ducted tail rotor system 140. In the exemplary embodiment shown in FIGS. 1A-1C, rotorcraft 100 with the main rotor system 110 and the anti-torque system 120 can maintain a heading by providing sufficient total anti-torque force T3 such that T3 equals torque T4. The total anti-torque force T3 can be greater than torque T4 to cause rotorcraft 100 to rotate in a first direction, whereas providing total anti-torque force T3 less than torque T4 can cause rotorcraft 100 to rotate in a direction opposite to the first direction.

In an embodiment, total anti-torque force T3 is generated by the anti-torque system 120 rotating both blades 138 in the primary ducted tail rotor system 130 and/or blades 148 in the secondary ducted tail rotor system 140. Blades 138, 148 in the primary and secondary ducted tail rotor systems 130, 140 can work in conjunction to provide first and second anti-torque forces T1, T2 sufficient to equal the total anti-torque force T3 (e.g., T3=T1+T2). Since the secondary ducted tail rotor system 140 provides an additional source of second anti-torque force T2, the configuration and operation of the primary ducted tail rotor system 130 can be modified as compared to a conventional tail rotor assembly having only one tail rotor system. The first anti-torque force T1 generated by the primary ducted tail rotor system 130 can be less than an anti-torque force generated by a conventional tail rotor assembly, which can provide several advantages. In an exemplary embodiment, blades 138 of the primary ducted tail rotor system 130 can be rotated at lower speeds due to lower anti-torque requirements as compared to a conventional tail rotor assembly, which can advantageously reduce blade noise and enable quieter operation of the rotorcraft 100. In another exemplary embodiment, the diameter of the primary ducted tail rotor system 130 can be less than the diameter of a conventional tail rotor assembly, which can provide at least one of the following advantages: reduced weight of the primary ducted tail rotor system 130 and quieter blades 138 during operation due to the reduced blade length.

Blades 138 in the primary ducted tail rotor system 130 and blades 148 in the secondary ducted tail rotor system 140 can be operated completely independent of each other to provide full redundancy for the anti-torque system 120. In the event of failure of the primary ducted tail rotor system 130, then second anti-torque force T2 can be generated by blades 148 in the secondary ducted tail rotor system 140 such that second anti-torque force T2 equals total anti-torque force T3 (e.g., T3=T2). Conversely, in the event of failure the secondary ducted tail rotor system 140, then first anti-torque force T1 can be generated by blades 138 in the primary ducted tail rotor system 130 such that first anti-torque force T1 equals total anti-torque force T3 (e.g., T3=T1).

In one embodiment, the first anti-torque force T1 generated by the primary tail rotor system 130 is substantially all of the total anti-torque force T3 needed during operation (e.g., the primary tail rotor 130 provides the majority of the total anti-torque force T3). When total anti-torque force T3 increases, the secondary tail rotor system 140 can be activated to provide supplemental anti-torque force (e.g., second anti-torque force T2).

Primary and secondary tail rotor systems 130, 140 and any other anti-torque system 120 components can be selectively controlled by control system 170. For example, as shown in FIG. 4, the control system 170 can include a primary control device 171, a secondary control device 173, input interfaces 180, and output interfaces 190.

Input interfaces 180 receive input information 172, 174 from a variety of sources (e.g. sensors, primary tail rotor system 130, secondary tail rotor system 140, pilot controls, flight control systems). Such input information may include, for example, information indicative of the speed and/or collective pitch blades 138, 148 of the primary and secondary tail rotor systems 130, 140. As another example, input interfaces 180 can receive pilot commands (e.g., a pilot yaw command transmitted as a result of the pilot pressing a foot down on a rudder pedal in the cockpit). In another example, input interfaces 180 receive commands from a fly-by-wire and/or other flight control systems. Another example of input interfaces 180 can include inputs from sensors associated with the rotorcraft 100, such as airspeed or density altitude sensors.

The primary and secondary control devices 171, 173 receive inputs 172, 174 to determine anti-torque instructions. The primary and secondary control devices 171, 173 can be operated independently to provide redundancy and/or can be combined as one device. The primary and secondary control devices 171, 173 determine and generate anti-torque instructions (e.g., output commands) and transmit output commands 176, 178 to the primary tail rotor system 130 and the secondary tail rotor system 140, respectively (e.g., a primary output command 176 for the primary tail rotor system 130, a secondary output command 178 for the secondary tail rotor system 140). For example, the primary control device 171 can generate instructions for selectively controlling the amount of the first anti-torque force T1 generated by the primary tail rotor system 130 (e.g., controlling speed of blades 138, collective pitch of blades 138). In another example, secondary control device 173 can generate instructions for selectively controlling the amount of the second anti-torque force T2 generated by the secondary tail rotor system 140 (e.g., controlling speed of blades 148, collective pitch of blades 148). In another example, primary and secondary control devices 171, 173 can send output commands 176, 178 to control rotorcraft yaw.

In an embodiment, the output commands 176, 178 are also transmitted to an output interface 190 that can comprise a primary tail rotor system display 193 and a secondary tail rotor system display 194. In an embodiment, each of the primary and secondary displays 193, 194 are located in the cockpit of the rotorcraft 100 and/or remote from the rotorcraft 100 for viewing by or otherwise alerting (e.g., including sound alarms, haptic alarms, and/or other sensory indications) the user/pilot. In an embodiment, each of the primary and secondary displays 193, 194 can be a multi-functional display that indicates at least one of following: the rpm of the blades in the respective tail rotor system; a warning of a malfunction, a pending malfunction (such as an over-temperature condition), and/or a loss of the primary and/or secondary tail rotor systems; a current acoustic signature; a desired acoustic signature; and a change in a rotorcraft condition input, a feedback input, and/or a pilot input as described hereinafter.

In operation, according to some example embodiments, an input interface 180 receives a request to change an amount of generated total anti-torque force T3. In one example embodiment, a pilot provides the request to change an amount of total anti-torque force T3 by, for example, pressing a foot down on a pedal assembly 181 (shown in FIG. 8) in the cockpit. In another example embodiment, the control system 170 determines and provides a request to change an amount of generated anti-torque force by, for example, transmitting an output to the primary and/or secondary ducted tail rotor systems 130, 140.

The input interface 180 may receive an indication of a change in the amount of total anti-torque force T3 for a variety of reasons. For example, the amount of total anti-torque force T3 may be changed to change the yaw of the aircraft. As another example, the amount of total anti-torque force T3 may be changed due to a change in outside conditions (e.g., increase in cross-wind speed). As yet another example, the amount of total anti-torque force T3 may be changed due to a change in aircraft operations. For example, as explained above, the total anti-torque force T3 generated by the anti-torque system 120 will increase if the relative airspeed of rotorcraft 100 increases. Accordingly, it may be necessary to increase the first and/or second anti-torque forces T1, T2 generated by the primary and secondary ducted tail rotors 130, 140 so as to maintain the equation T3=T1+T2=T3.

In one embodiment, the primary ducted tail rotor system 130 is mechanically powered by the tail rotor drive shaft 158, while the secondary ducted tail rotor system 140 is electrically powered by electrical power supply 162. The response times of the primary and secondary ducted tail rotor systems 130, 140 are a function of the energy provided by their respective power sources (e.g., first power system 150, second power system 160). Accordingly, in some embodiments, the primary ducted tail rotor system 130 can have a faster response time than the secondary ducted tail rotor system 140. In other embodiments, the secondary ducted tail rotor system 140 can have a faster response time than the primary ducted tail rotor system 130. Since the response times of the primary and secondary rotor systems 130, 140 are different, the control system 170 (e.g., the primary control device 171, the secondary control device 173) can be configured to select the tail rotor system (e.g., select either the primary or secondary ducted tail rotor system 130, 140) having the fastest (e.g., shortest) response time in certain operational situations (e.g., when torque T4 from the main rotor blade suddenly increases).

Users 205 may access control system 170 through computer systems 210. For example, in some embodiments, users 205 may provide flight control inputs that may be processed using a computer system 210. Users 205 may include any individual, group of individuals, entity, machine, and/or mechanism that interacts with computer systems 210. Examples of users 205 include, but are not limited to, a pilot, service person, engineer, technician, contractor, agent, and/or employee. Users 205 may be associated with an organization. An organization may include any social arrangement that pursues collective goals. One example of an organization is a business. A business is an organization designed to provide goods or services, or both, to consumers, governmental entities, and/or other businesses.

Computer system 210 may include processors 212, input/output devices 214, communications links 216, and memory 218. In other embodiments, computer system 210 may include more, less, or other components. Computer system 210 may be operable to perform one or more operations of various embodiments. Although the embodiment shown provides one example of computer system 210 that may be used with other embodiments, such other embodiments may utilize computers other than computer system 210. Additionally, embodiments may also employ multiple computer systems 210 or other computers networked together in one or more public and/or private computer networks, such as one or more networks 230. Computer system 210 may exist wholly or partially on-board the aircraft, off-board the aircraft (e.g., in a ground station), or a combination of the two.

Processors 212 represent devices operable to execute logic contained within a medium. Examples of processor 212 include one or more microprocessors, one or more applications, and/or other logic. Computer system 210 may include one or multiple processors 212.

Input/output devices 214 may include any device or interface operable to enable communication between computer system 210 and external components, including communication with a user or another system. Example input/output devices 214 may include, but are not limited to, a mouse, keyboard, display, and printer.

Network interfaces 216 are operable to facilitate communication between computer system 210 and another element of a network, such as other computer systems 210. Network interfaces 216 may connect to any number and combination of wireline and/or wireless networks suitable for data transmission, including transmission of communications. Network interfaces 216 may, for example, communicate audio and/or video signals, messages, internet protocol packets, frame relay frames, asynchronous transfer mode cells, and/or other suitable data between network addresses. Network interfaces 216 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 218 represents any suitable storage mechanism and may store any data for use by computer system 210. Memory 218 may comprise one or more tangible, computer-readable, and/or computer-executable storage medium. Examples of memory 218 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 218 stores logic 220. Logic 220 facilitates operation of computer system 210. Logic 220 may include hardware, software, and/or other logic. Logic 220 may be encoded in one or more tangible, non-transitory media and may perform operations when executed by a computer. Logic 220 may include a computer program, software, computer executable instructions, and/or instructions capable of being executed by computer system 210. Example logic 220 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 220 may also be embedded within any other suitable medium without departing from the scope of the invention.

Various communications between computers 210 or components of computers 210 may occur across a network, such as network 230. Network 230 may represent any number and combination of wireline and/or wireless networks suitable for data transmission. Network 230 may, for example, communicate internet protocol packets, frame relay frames, asynchronous transfer mode cells, and/or other suitable data between network addresses. Network 230 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 230, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Figure 5:
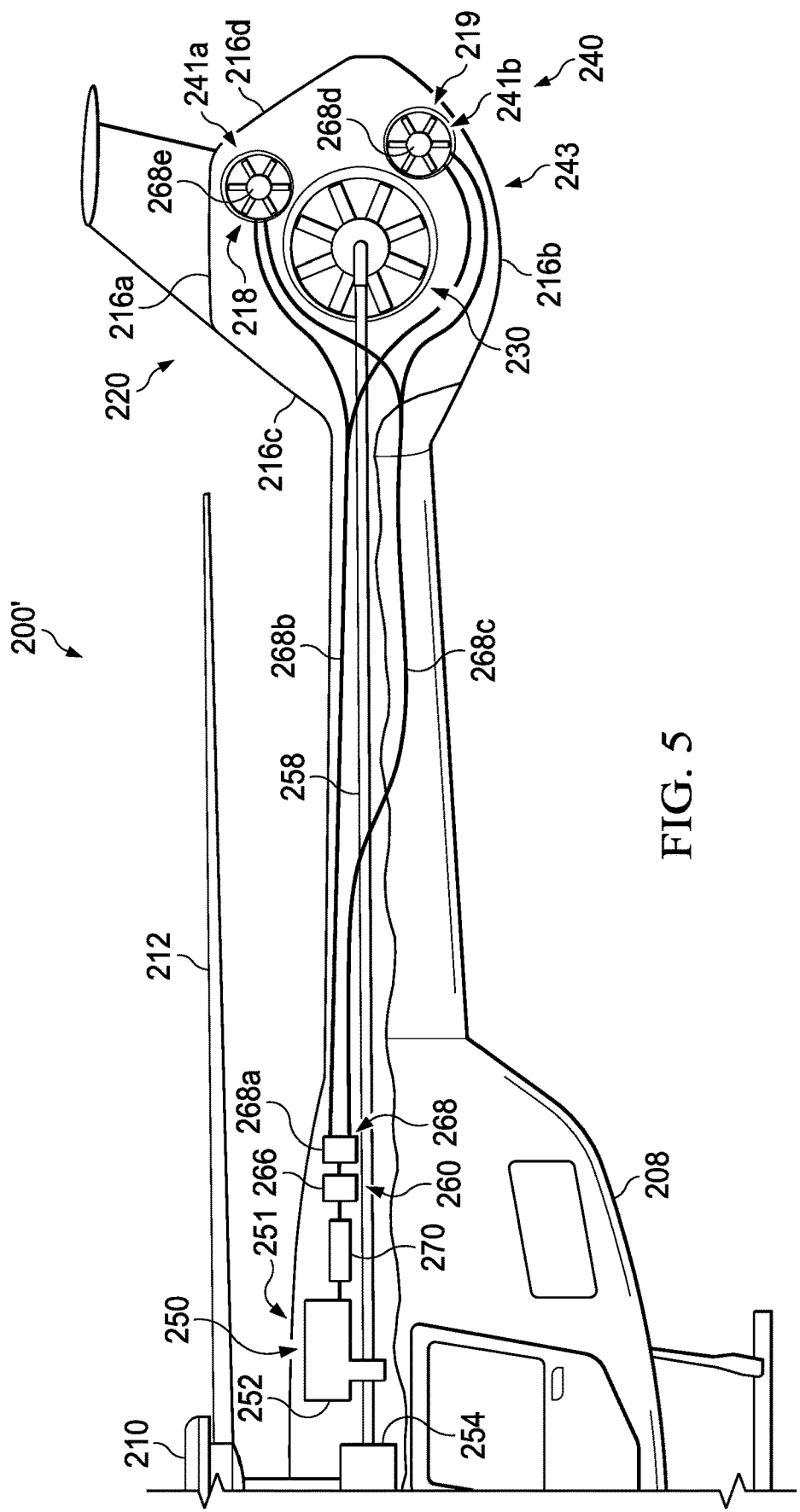
FIG. 5 shows a partial cut-away side view of a rotorcraft, according to an exemplary embodiment.

FIG. 5 depicts another embodiment of rotorcraft 200 with anti-torque system 220'. Certain features of the rotorcraft 200 are as described above and bear similar reference characters to the rotorcraft 200, but with a leading '2' rather than a leading '1'. The secondary ducted tail rotor system 240 is powered by second power system 260. The second power system 260 can include a secondary power source 266 and a drive system 268. The secondary power source 266 can be, for example, a traditional aircraft engine and/or an electrical power supply. The secondary power source 266 is coupled to a drive system 268, which in the embodiment shown, is a hydraulic drive system including a hydraulic pump 268a, high pressure drive line 268b, return line 268c, and hydraulic motors 268d, 268e. The hydraulic drive system 268 is operably coupled to the plurality of tail rotor assemblies 243 in the secondary ducted tail rotor system 240. The hydraulic drive system 268 provides power to hydraulic motors 268d, 268e in the plurality of tail rotor assemblies 243 to rotate the rotor blades therein and provide a second anti-torque force T2.

Figure 6:
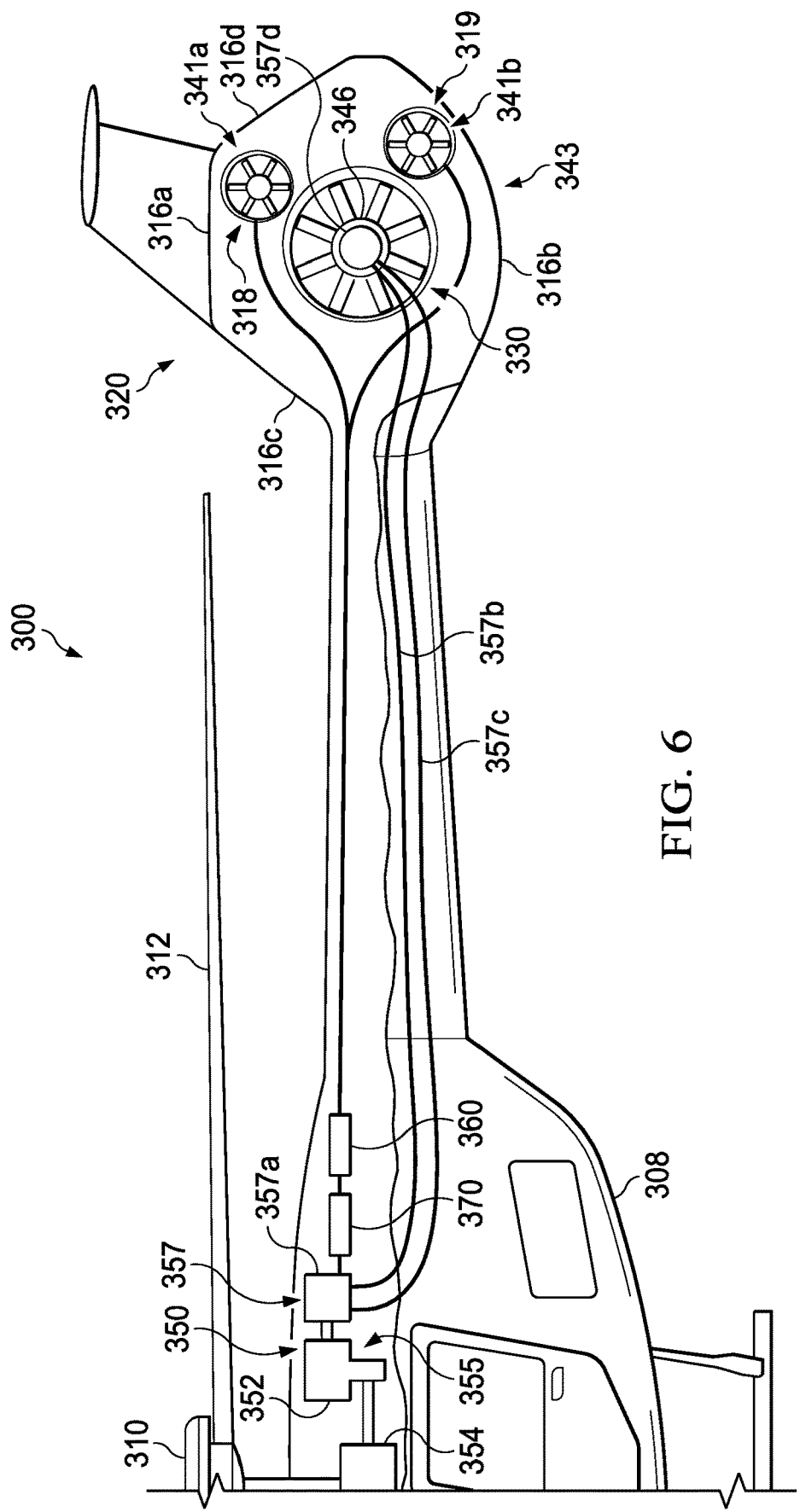
FIG. 6 shows a partial cut-away side of a rotorcraft, according to one example embodiment.

In another example, FIG. 6 depicts another embodiment of rotorcraft 300 with anti-torque system 320. Certain features of the rotorcraft 300 are as described above and bear similar reference characters to the rotorcraft 300, but with a leading '3' rather than a leading '1'. The primary ducted tail rotor system 330 is powered by first power system 350. The first power system 350 can include a primary power source 355 and a drive system 357. The primary power source 355 can be, for example, a traditional aircraft engine 352. The primary power source 355 is coupled to a drive system 357, which in the embodiment shown, is a hydraulic drive system including a hydraulic pump 357a, high pressure drive line 357b, return line 357c, and hydraulic motor 357d. The hydraulic drive system 357 is operably coupled to the primary ducted tail rotor system 330. The hydraulic drive system 357 provides power to hydraulic motor 357d mounted in hub 346 to rotate rotor blades therein and provide a first anti-torque force T1.

Figure 8:
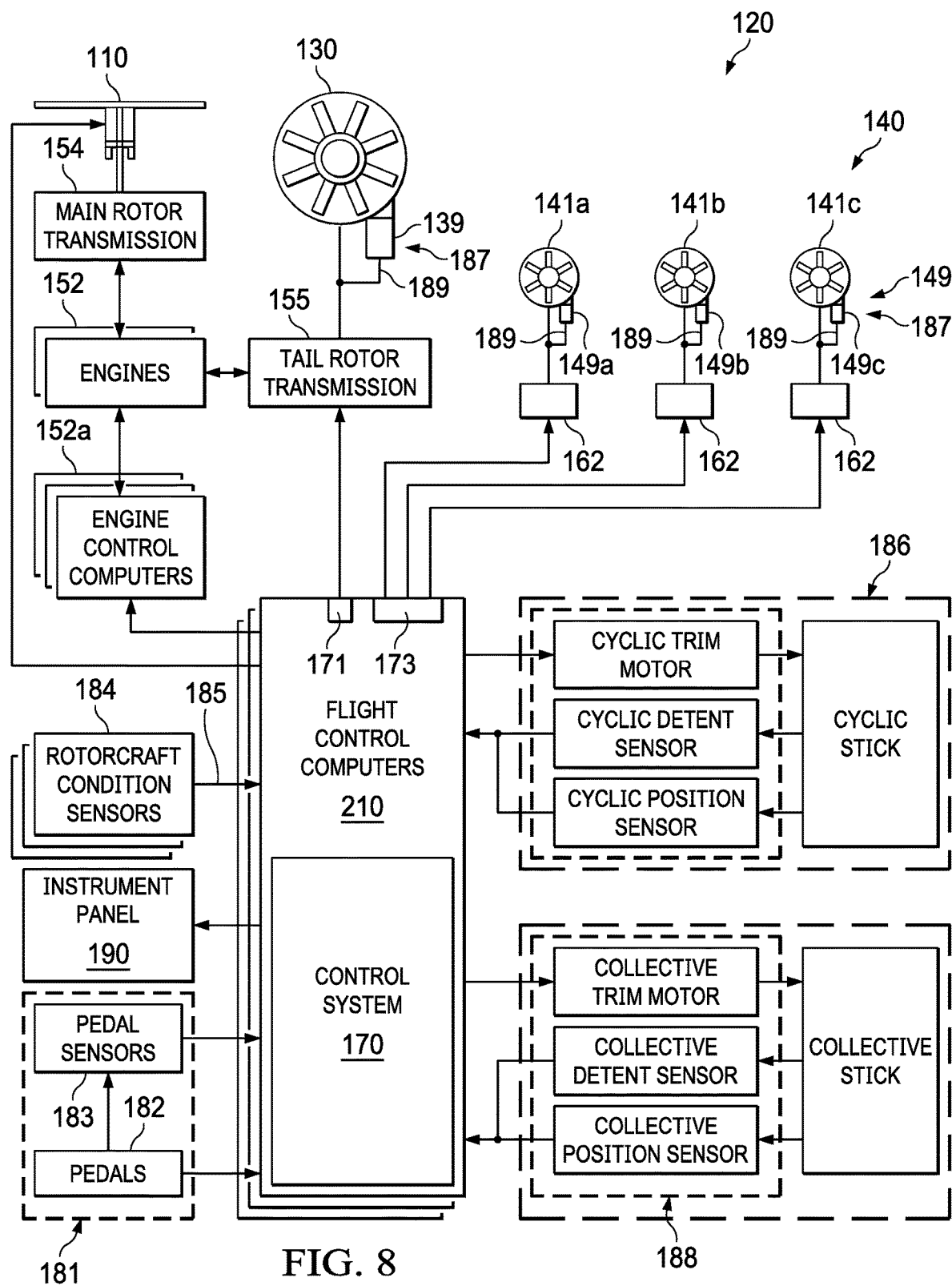
FIG. 8 is a block diagram of a system for providing an anti-torque force in a rotorcraft, according to an illustrative embodiment.
Figure 10:
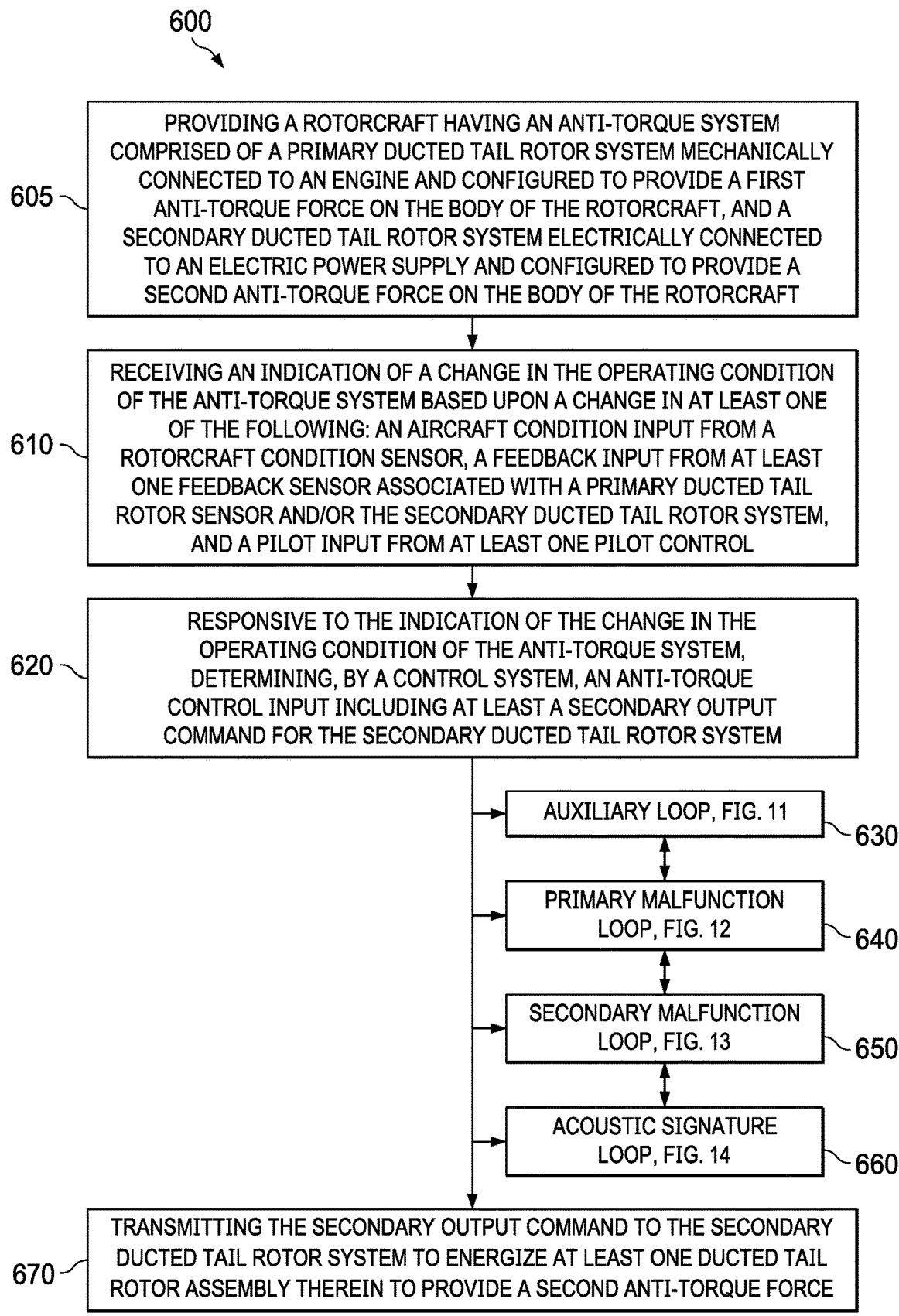
FIG. 10 is a flowchart depicting a method of providing an anti-torque force in a rotorcraft, according to an embodiment.

Referring now to FIGS. 4 and 8, primary and secondary ducted tail rotor systems 130, 140 and any other components operably associated with the anti-torque system 120 can be selectively controlled by the control system 170. Implementations of the control system 170 may include one or more features of a method of providing an anti-torque force in a rotorcraft 600, as shown in FIG. 10. The control system 170 in some embodiments features at least one or more of following: input interfaces 180 that are configured to receive inputs from at least one of the following a rotorcraft sensor 184, a feedback sensor 187, and a pilot control (e.g., cyclic control system 186, a collective control system 188, and pedal assembly 181 as schematically shown in FIG. 8), a primary control device 171, and/or a secondary control device 173.

In an embodiment, the control system 170 is a fly-by-wire (FBW) system to assist pilots in stably flying the rotorcraft to reduce workload on the pilots. The FBW system may provide different control characteristics or responses for at least one pilot control including cyclic input, collective input, and/or pedal control input in the different flight regimes, and may provide stability assistance or enhancement by decoupling physical flight characteristics so that a pilot is relieved from needing to compensate for some flight commands issued to the rotorcraft. The FBW system may be implemented in one or more flight control computers 210 disposed between the pilot controls and flight control systems, providing correctional inputs to flight controls that assist in operating the rotorcraft more efficiently or that put the rotorcraft into a stable flight mode while still allowing the pilot to input flight commands in addition to the stabilization inputs automatically provided by the FBW system. The FBW system in the rotorcraft 100 may, for example, may implement one or more steps of the method 600 automatically. In some embodiments, the FBW automatically overrides a pilot input to provide for default or suggested anti-torque control forces (e.g., a default or suggested first anti-torque control force T1, second anti-torque control force T2, and/or a total anti-torque control force T3). Further in an embodiment, the pilot can intervene manually and deactivate at least a portion of the correctional inputs and/or the stabilization inputs determined by the FBW system.

The method 600 begins with a step 605 of providing a primary ducted tail rotor system 130 mechanically connected to an engine 152. The primary ducted tail rotor system 130 is configured to provide a first anti-torque force T1 on the body 104 of a rotorcraft 100. The step 605 further includes providing a secondary ducted tail rotor system 140 electrically connected to an electric power supply 162. The secondary ducted tail rotor system 140 configured to provide a second anti-torque force T2 on the body 104 of rotorcraft 100.

The method 600 includes a step 610 of receiving an indication of a change in the operating condition of the anti-torque system based upon a change in at least one of the following: a rotorcraft condition input 185 from a rotorcraft condition sensor 184, a feedback input 189 from at least one feedback sensor 187 associated with a primary ducted tail rotor system 130 and/or a secondary ducted tail rotor system 140, and a pilot input from at least one pilot control.

Responsive to the indication of the change in the operating condition of the anti-torque system, the method 600 includes the step 620 of determining, by a control system 170, an anti-torque control input including at least a secondary output command 178 for controlling the secondary ducted tail rotor system 140. In an embodiment, the control system 170 is operably associated with the flight control computer 210 and the secondary control device 173 such that at least a portion of the step 620 is performed by at least the flight control computer 210 and/or the secondary control device 173. In an exemplary embodiment, the anti-torque control input comprises a secondary output command 178 and a primary output command 176 for the secondary tail rotor system 140 and primary tail rotor system 130, respectively. In some embodiments, the anti-torque control input further comprises primary and secondary output commands that are transmitted to the output interface 190.

The step 620 of determining, by a control system 170, an anti-torque control input can further include a primary output command 176 for controlling the primary ducted tail rotor system 130. In an embodiment, the control system 170 is operably associated with the flight control computer 210 and the primary control device 171 such that at least a portion of the step 620 is performed by at least the flight control computer 210 and/or the primary control device 171. In some embodiments, the primary control device 171 is operably associated with engine control computers 152a (e.g., a full authority digital control engine (FADEC)) and/or operably associated with the flight control computers 210.

Figure 11:
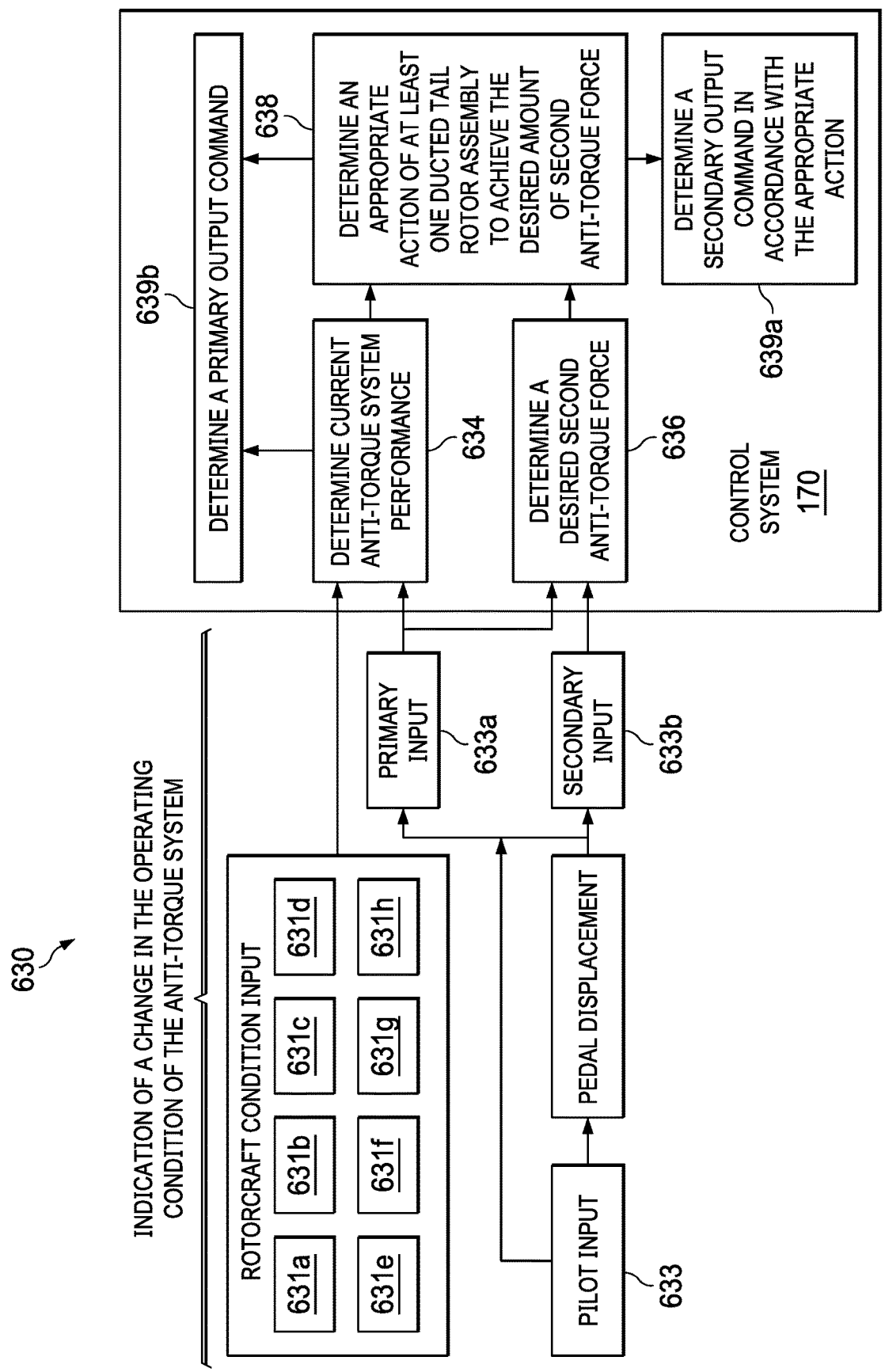
FIG. 11 illustrates a method in accordance with the flowchart of FIG. 10, according to an illustrative embodiment.
Figure 12:
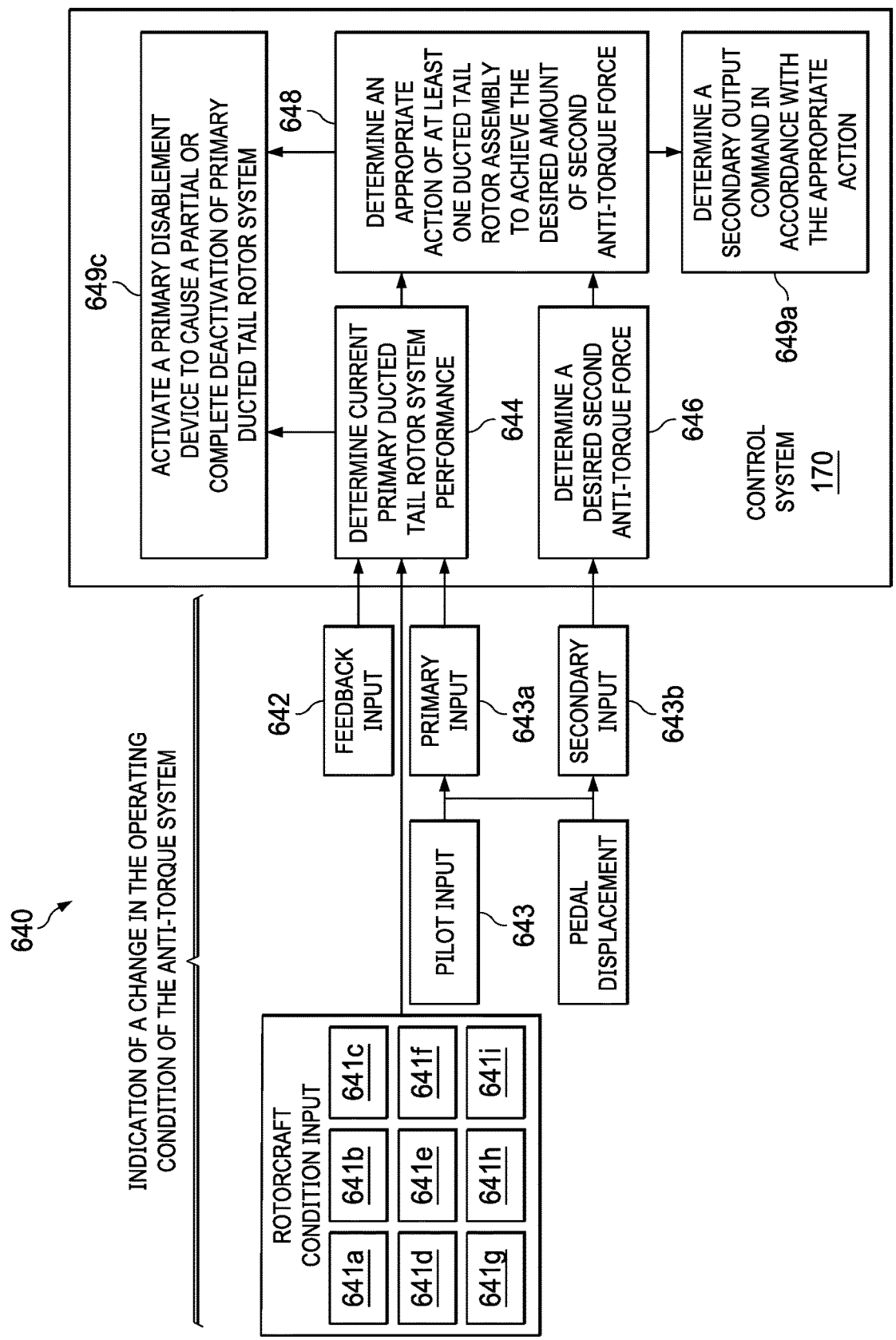
FIG. 12 illustrates a method in accordance with the flowchart of FIG. 10, according to an exemplary embodiment.
Figure 13:
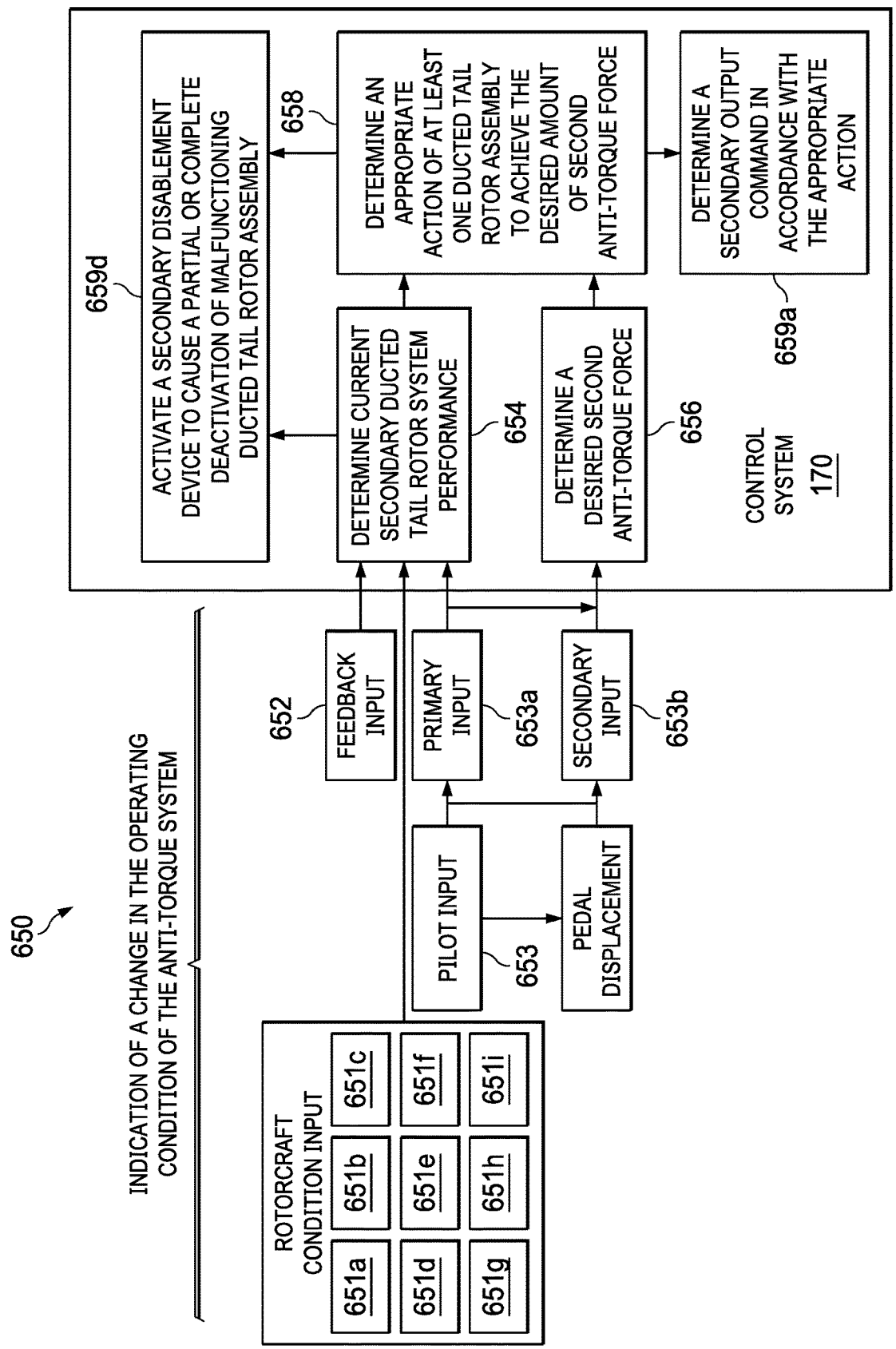
FIG. 13 illustrates a method in accordance with the flowchart of FIG. 10, according to an exemplary embodiment.
Figure 14:
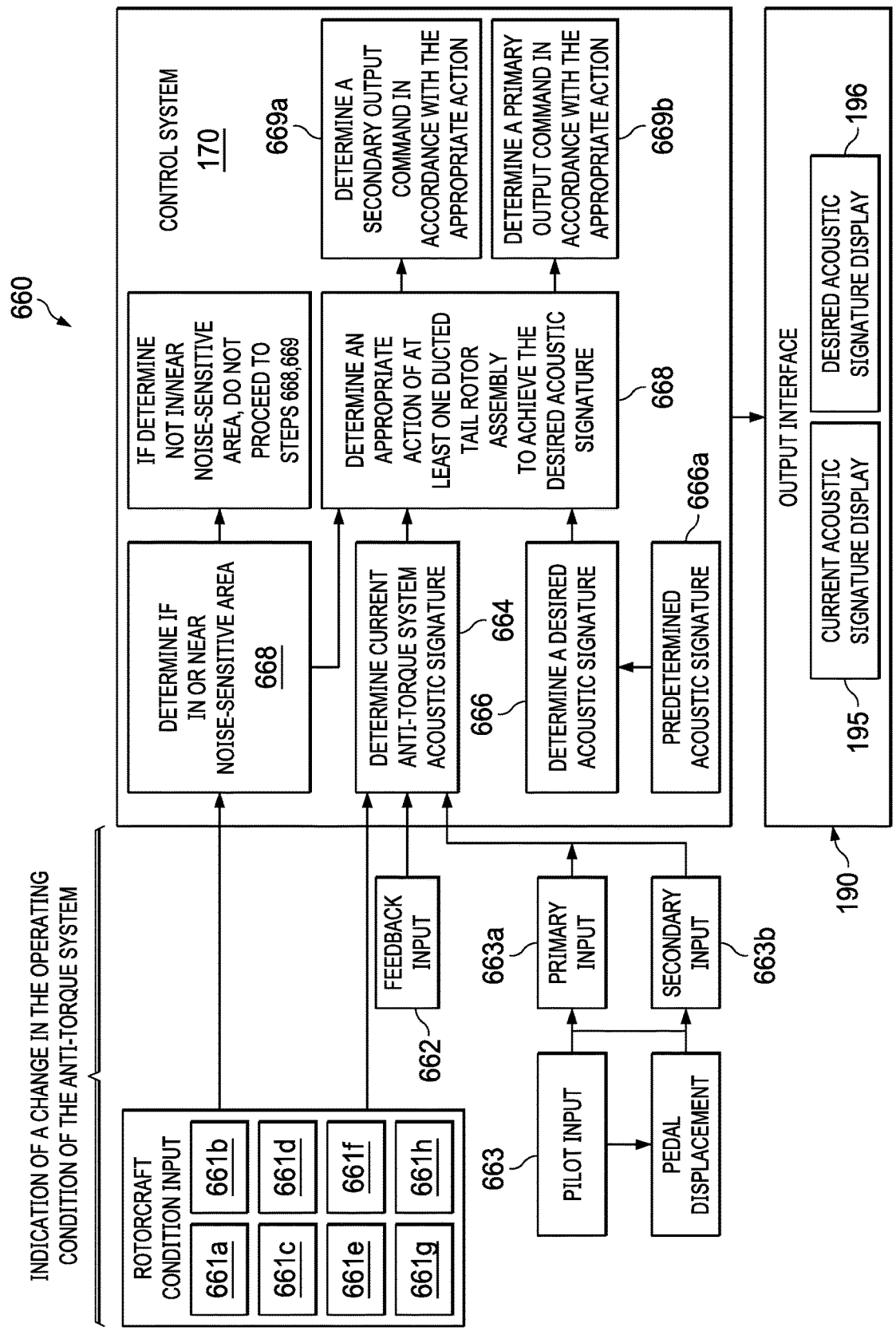
FIG. 14 illustrates a method in accordance with the flowchart of FIG. 10, according to an illustrative embodiment.

For illustrative purposes, and ease of explanation, the step 620 of determining an anti-control torque control input including at least a secondary output command 178 for the secondary ducted tail rotor system 140 is depicted as being structured as four loops in FIGS. 11-14 (e.g. an auxiliary loop 630 in FIG. 11, a primary malfunction loop 640 in FIG. 12, a secondary malfunction loop 650 in FIG. 13, and an acoustic signature loop 660 in FIG. 14). In some embodiments, two or more of the loops, or portions thereof, may be combined. In some embodiments, additional loops may be included. In some embodiments, one or more of the loops, or portion(s) thereof, may be optional. One or more of the loops may correspond to a set of logic. The logic may be configured to control the anti-torque system 120, namely, to control the primary ducted tail rotor system 130 and secondary ducted tail rotor system 140 to produce at least a second anti-torque force T2 and, in some embodiments, first and second anti-torque forces T1, T2. The implementation of any of the four loops may be selected by manually by a user (e.g., a pilot) and/or automatically by computer system 210.

The method 600 includes the step 670 of transmitting the secondary output command 178 to the secondary ducted tail rotor system 140 to energize at least one ducted tail rotor assembly 141 therein to provide a second anti-torque force T2. In an embodiment, the step 670 of transmitting comprises transmitting the secondary output command 178 from the secondary control device 173 to the electronic power supply 162 to control at least one ducted tail rotor assembly 141.

In some embodiments, the step 670 includes transmitting the primary output command 176 to the primary ducted tail rotor system 130 to control the amount of the first anti-torque force T1. For example, but not limitation, the step 670 can include transmitting the primary output command 176 to the primary ducted tail rotor system when any of the auxiliary loop 630 and/or the acoustic signature loop 660 are implemented. In an embodiment, the step 670 of transmitting comprises transmitting the primary output command 176 from the primary control device 171 to at least one of the tail rotor transmission 155 and engine control computers 152a.

The control logic of method 600 is initiated at step 610 when the control system 170 receives an indication of a change in the operating condition of the anti-torque system. In an embodiment, the indication of a change is based upon a change in an input from at least one of the following: the rotorcraft condition input 185 from at least one rotorcraft condition sensor 184, the feedback input 189 from at least one feedback sensor 187 associated with a primary ducted tail rotor system 130 and/or a secondary ducted tail rotor system 140, and a pilot input from at least one pilot control. In some embodiments, any of the four loops (e.g., an auxiliary loop 630, a primary malfunction loop 640, a secondary malfunction loop 650, and an acoustic signature loop 660) in step 620 may be initiated based on two or more inputs, or portions thereof, may be combined (e.g., the primary and/or secondary malfunction loops 640, 650 may detect a malfunction, a pending malfunction, and/or loss of the functionality of the acoustic signature loop 660). In some embodiments, additional inputs may be included. In some embodiments, one or more of the inputs, or portion(s) thereof, may be optional. An indication of a change in the operating condition of the anti-torque system in step 610 can be received manually by a user (e.g., a pilot) and/or automatically by computer system 210.

In an embodiment, the operating condition can comprise an operating condition of the rotorcraft 100 (e.g., generally regarded as a stable operating condition with sufficient total anti-torque force T3 from the anti-torque system 120). In some embodiments, the operating condition can change to an unstable condition (insufficient total anti-torque force T3, e.g., an amount of anti-torque force less than T3), which can result from a malfunction of a component in the primary and/or secondary ducted tail rotor systems 130, 140. In another embodiment, the operating condition can change to an unstable condition (insufficient total anti-torque force T3, e.g., an amount of anti-torque force less than T3) resulting from a change in environmental conditions (e.g., strong cross-winds) and/or additional weight of the rotorcraft (e.g., a rescue mission or additional cargo causing the weight of the rotorcraft to increase).

Now referring more particularly to the embodiments of the step 610 in method 600, the step 610 can include operably associating at least one of a rotorcraft condition sensor 184, a feedback sensor 187, and a pilot control with the rotorcraft 100. The input interface 180 can comprise the rotorcraft condition sensor 184, the feedback sensor 187, and the pilot control. In some embodiments, the input interface 180 comprises only the pilot control. In other embodiments, the input interface 180 comprises only the rotorcraft condition sensor 184 (e.g., for fly-by-wire systems). In some embodiments, the input interface 180 includes both the rotorcraft condition sensor 184 and feedback sensor 187 and the pilot control. In some embodiments, the pilot input generated by the pilot controls can include a primary input 172 associated with the primary ducted tail rotor system 130 and a secondary input 174 associated with the secondary ducted tail rotor system 140.

In an embodiment, as shown in FIG. 8, the rotorcraft condition sensors 184 are operable to sense an operating condition of the rotorcraft and generate a rotorcraft condition input 185 (e.g., a rotorcraft condition signal representing a condition which influences the operation of the rotorcraft). Rotorcraft condition sensors 184 comprise at least one rotorcraft condition sensor and/or a plurality of rotorcraft condition sensors. Rotorcraft condition sensors 184 may include condition sensors for measuring a variety of rotorcraft systems, flight parameters, environmental conditions, density, gross weight, rotorcraft configuration, and the like. For example, the rotorcraft condition sensors 184 may include sensors for measuring noise, airspeed, altitude, attitude, vibration, position, orientation, temperature, airspeed, vertical speed, and the like. In an embodiment, rotorcraft condition sensors 184 do not include sensors associated with a cyclic control system 186, a collective control system 188, and a pedal assembly 181. In some embodiments, rotorcraft condition sensors 184 may be disposed on and/or in the rotorcraft 100 (including RADAR, LIDAR, acoustic, visual, or other suitable flight condition sensors).

In some embodiment, the rotorcraft condition sensors 184 could include a location input. A location input can comprise at least one input from location, landing, building and/or environmental sensors relying upon data or signals originating external to the rotorcraft, such as a global positioning system (GPS) sensor, a VHF Omnidirectional Range sensor, Instrument Landing System (ILS), and the like. In an exemplary embodiment, the inputs from the rotorcraft condition sensors 184 (e.g. noise, vibration, location, and/or landing sensors) are used to determine if the rotorcraft is in or near a noise-sensitive location).

In some embodiments, as shown in FIG. 8, the control system 170 includes a feedback sensor 187 associated with the primary ducted tail rotor system 130 and/or the secondary ducted tail rotor system 140. In some embodiments, the feedback sensor 187 comprises a plurality of feedback sensors 187, each generating a feedback input 189 (e.g., a feedback signal representing the operational status of the respective ducted rotor system 130, 140) representing the operational status of the ducted tail rotor system 130, 140 associated therewith (e.g., a feedback signal representing the operational status of the respective ducted rotor system 130, 140). In an embodiment, the feedback sensors 187 comprises at least one primary ducted tail rotor sensor 139 and at least one secondary ducted tail rotor sensor 149 (e.g., first, second, and third secondary tail rotor sensors 149a, 149b, 149c. The at least one primary ducted tail rotor sensor 139 and at least one secondary ducted tail rotor sensor 149 are configured to detect and convey the operational status of the primary ducted tail rotor system 130 and/or the secondary ducted tail rotor system 140, respectively. In some embodiments, the at least one primary and secondary ducted tail rotor sensors 139, 149 sense the operational status of the respective ducted tail rotor system 130, 140 including sensing vibrations during the operation thereof and/or the speed and/or position of the respective blades therein. In an exemplary embodiment, the at least one primary ducted tail rotor sensor 139 and at least one secondary ducted tail rotor sensor 149 can comprise an accelerometer and/or a tachometer. In some embodiments, the primary and/or secondary ducted tail rotor sensors 139, 149 can be in communication with the respective primary and secondary control devices 171, 173.

In some embodiments, the feedback sensor 187 comprises the at least one primary ducted tail rotor sensor 139 configured to sense a malfunction, a pending malfunction, and/or an inoperable status and to output a primary ducted tail rotor loss signal to the control system 170. In an embodiment, the at least one primary ducted sensor 139 is operably associated with the primary ducted to tail rotor system 130 and the control system 170. In an embodiment, the at least one primary ducted tail rotor sensor 139 is associated with the primary duct 115 and senses harmonic vibration of the primary ducted tail rotor system 130 for detection of a vibrational anomaly. In an embodiment, the at least one primary ducted tail rotor sensor 139 senses the temperature of the primary ducted tail rotor system 130 for detecting an over-temperature condition thereof (e.g., for example, the primary ducted tail rotor sensor 139 can comprise a contact sensor such as a thermocouple, and a non-contact sensor such as a digital infrared temperature sensor).

In certain embodiments, the feedback sensor 187 comprises at least one secondary ducted tail rotor sensor 149 configured to sense a malfunction, a pending malfunction, and/or inoperable status therefor and to output a secondary ducted tail rotor loss signal to the control system 170. In an embodiment, the at least one secondary ducted sensor 149 is operably associated with the secondary ducted to tail rotor system 140 and the control system 170. In an exemplary embodiment, the at least one secondary ducted tail rotor sensor 149 (e.g., a first, second, third secondary ducted tail rotor sensor 149a, 149b, 149c) is associated with the respective duct surrounding the secondary tail ducted rotor assemblies 141, (e.g., first, second, and third ducted tail rotor assemblies 141a, 141b, 141c in FIG. 8) as described herein. In certain embodiments, the harmonic vibrations produced by the secondary ducted tail rotor assemblies are sensed by the respective secondary ducted tail rotor sensor 149, which can be used to detect a vibrational anomaly. In an embodiment, the at least one secondary ducted tail rotor sensor 149 senses the temperature of at least one secondary ducted tail rotor assembly for detecting an over-temperature condition thereof (e.g., for example, the secondary ducted tail rotor sensor 149 can comprise a contact sensor such as a thermocouple, and a non-contact sensor such as a digital infrared temperature sensor).

A pilot may manipulate at least one pilot control in order to control the anti-torque force and flight of the rotorcraft 100 and generate a pilot input. The pilot controls, as shown in FIG. 8, are operable to receive a pilot input from the pilot and generate a signal therefrom (e.g., a primary input 172, a secondary input 174). In an embodiment, the pilot controls include manual controls such as a cyclic stick in a cyclic control system 186, a collective stick in a collective control system 188, and pedals 182 in a pedal assembly 181 for anti-torque and yaw control. The cyclic control system 186 and collective control system 188 receive pilot inputs for controlling the main rotor system 110, while the pedal assembly receives pilot inputs for controlling the anti-torque system 120. In other implementations, the pilot controls can include a computer interface being operable to sense an acoustic or physical input, respectfully. The pilot controls may be disposed on the rotorcraft 100 and/or remote therefrom. The pilot controls on the rotorcraft 100 may include mechanical and/or electrical systems operable to transmit an input to computer system 210.

In an exemplary embodiment, the pilot control is at least the pedal assembly 181 for generating the pilot input. In an embodiment, the pilot control is only the pedal assembly 181. In some embodiments, the input interface 180 is limited only to the pedal assembly 181. The pedal assembly 181 may include mechanical and/or electrical systems operable to transmit an indication of change in an operating condition (e.g., a pilot input that is a signal indicating a change received from the pedal assembly 181, for example, the primary input 172, the secondary input 174) to computer system 210. In some implementations, the at least one pilot control includes mechanical and/or electrical systems that are connected directly to the primary and/or secondary ducted tail rotor system 130, 140 (e.g., the pedal assembly 181 is directly connected mechanically and/or electrically to the respective primary ducted tail rotor system 130 and secondary ducted tail rotor system 140, e.g., bypassing or not including the control system 170, flight control computers 210, primary control device 171, and secondary control device 173). For example, in some embodiments, the pedal assembly 181 is connected directly to the electric power supply 162 to control power to the at least one tail rotor assembly 141 in the secondary ducted tail rotor system 140, as schematically shown in FIG. 9A.

The pedal assembly 181 includes a pair of pedals 182 (left and right pedals for controlling the direction of the total anti-torque force T3 and yaw during flight) and pedal sensors 183 operably associated with the pedals 182. The pedal sensors 183 are configured to detect displacement of the respective pedal 182 (e.g., change in position or in other input elements associated with the pedals 182). In an embodiment, the pilot input from at least one pilot control comprises sensing a displacement of the pedal 182 by the sensor 183. The sensed displacement of the pedal 182 by the sensor 183 indicates a change in the operating condition of the anti-torque system. In some embodiments, the displacement of the pedal 182 senses a first position P1 to generate a primary input 172 and senses a second position P2 to generate a secondary input 174 for controlling the primary and secondary ducted tail rotor systems 130, 140, respectively. In some embodiments, the primary input 172 comprises a primary pedal input and the secondary input 174 comprises a secondary pedal input. In an embodiment, the displacement of the pedal 182 to first position P1 indicates a desired first anti-torque force (T1). In an embodiment, the displacement of the pedal 182 to a second position indicates a desired second anti-torque force (T2). In an embodiment, the displacement of the pedal 182 to a first position P1 is a primary pedal control input associated with controlling the primary ducted tail rotor system 130 and the displacement of the pedal 182 to a second position P2 is a secondary pedal control input associated with controlling the secondary ducted tail rotor system 140. Accordingly, the pedal 182 is configured to be positioned to the first position P1 to indicate a change in the operating condition of the primary ducted tail rotor system and a second position P2 to indicate a change in the operating condition in the secondary ducted tail rotor system.

Figure 9A:
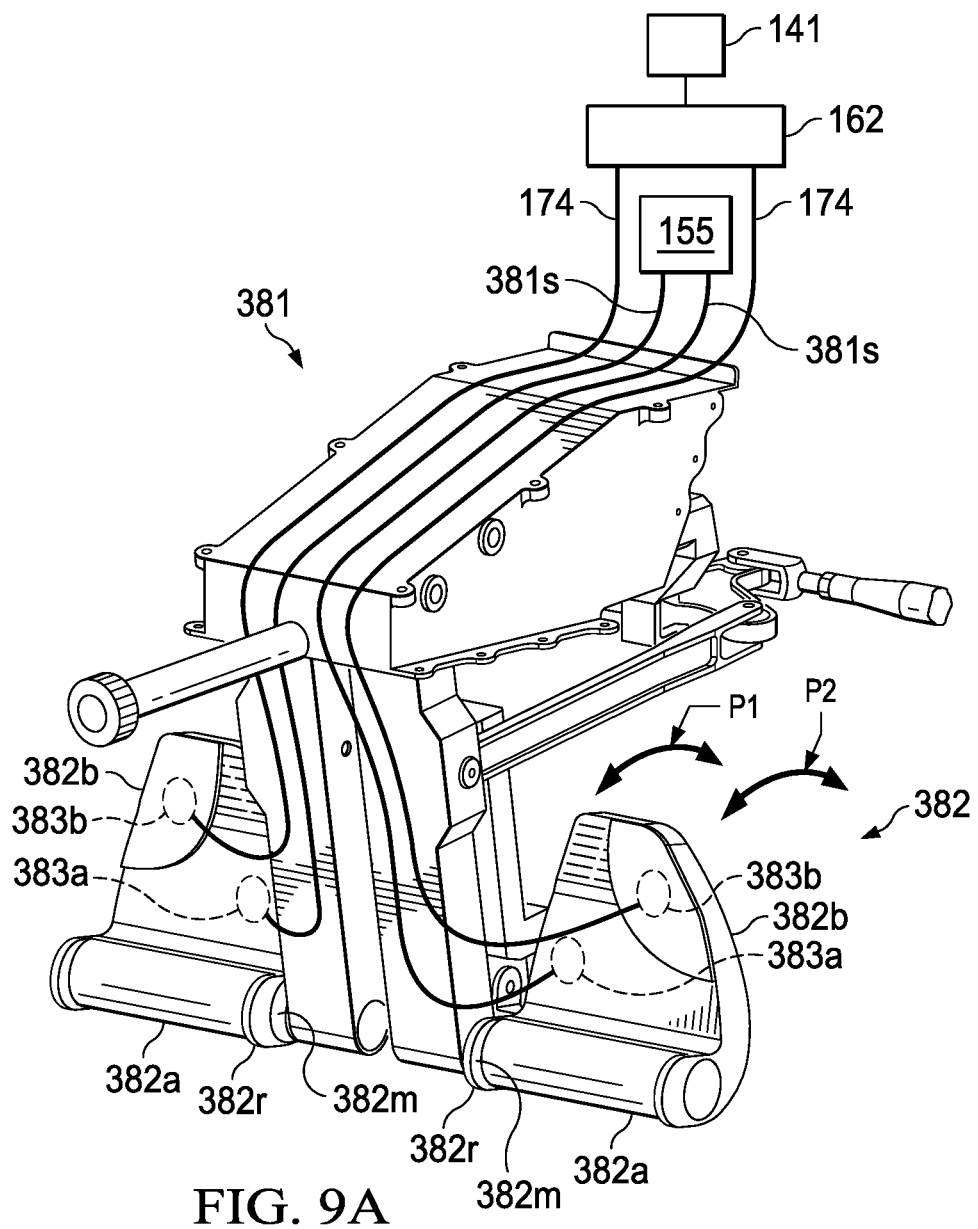
FIG. 9A is a front perspective view of an exemplary pedal assembly, according to an embodiment.

FIG. 9A shows an example embodiment of a pilot or co-pilot's pedal assembly 381. Certain components of the pedal assembly 381 are as described above in connection with the pedal assembly 181. Those components bear similar reference characters to the components of the pedal assembly 181. Each of the pair of pedals 382 is connected to a pedal sensor 383 for sensing the displacement of the pedal 382. Each pedal 382 includes at least two separate independent pedal surfaces including a primary pedal member 382*a* for controlling the primary ducted tail rotor system 130 and a secondary pedal member 382*b* for controlling the secondary ducted tail rotor system 140. In the embodiment shown, the primary pedal member 382*a* is large and adjacent to a support member 381*s* for the pedal assembly 381 (e.g., an interior location) while the secondary pedal member 382*b* is smaller than the primary pedal member 382*a* and is located at an exterior location on the pedal. It will be understood by those skilled in the art that the actual size and shape of each of the primary and secondary pedal members 382*a*, 382*b* may take on a wide variety of configurations. For example, the primary and secondary pedal members 382*a*, 382*b* could each be half (right and left portions) of each pedal 382.

The pedal sensor 383 includes a primary pedal sensor 383*a* and a secondary pedal sensor 383*b*, each operably associated with the primary pedal member 382*a* and secondary pedal member 382*b* for sensing the displacement thereof, respectively. In an embodiment, the displacement of the primary pedal member 382*a* to first position P1 indicates a desired first anti-torque force (T1). In an embodiment, the displacement of the secondary pedal member 382*b* to a second position P1 indicates a desired second anti-torque force (T2). In an embodiment, the displacement of both the primary and secondary pedal members 382*a*, 382*b* indicates a desired total anti-torque force (T3).

In some embodiments, each of the pedals 382 includes a mechanical return element 382*r* (schematically shown) that centers the primary and secondary pedal members 382*a*, 382*b* when the pilot releases the pedals 382.

In other embodiments, the pedal control assembly 381 has one or more trim motors 382*m* that drive the first and second pedal members to 382*a*, 382*b* to a suggested first and/or second position P1, P2 according to a predetermined first or second pedal position output from the control system 170.

Figure 9B:
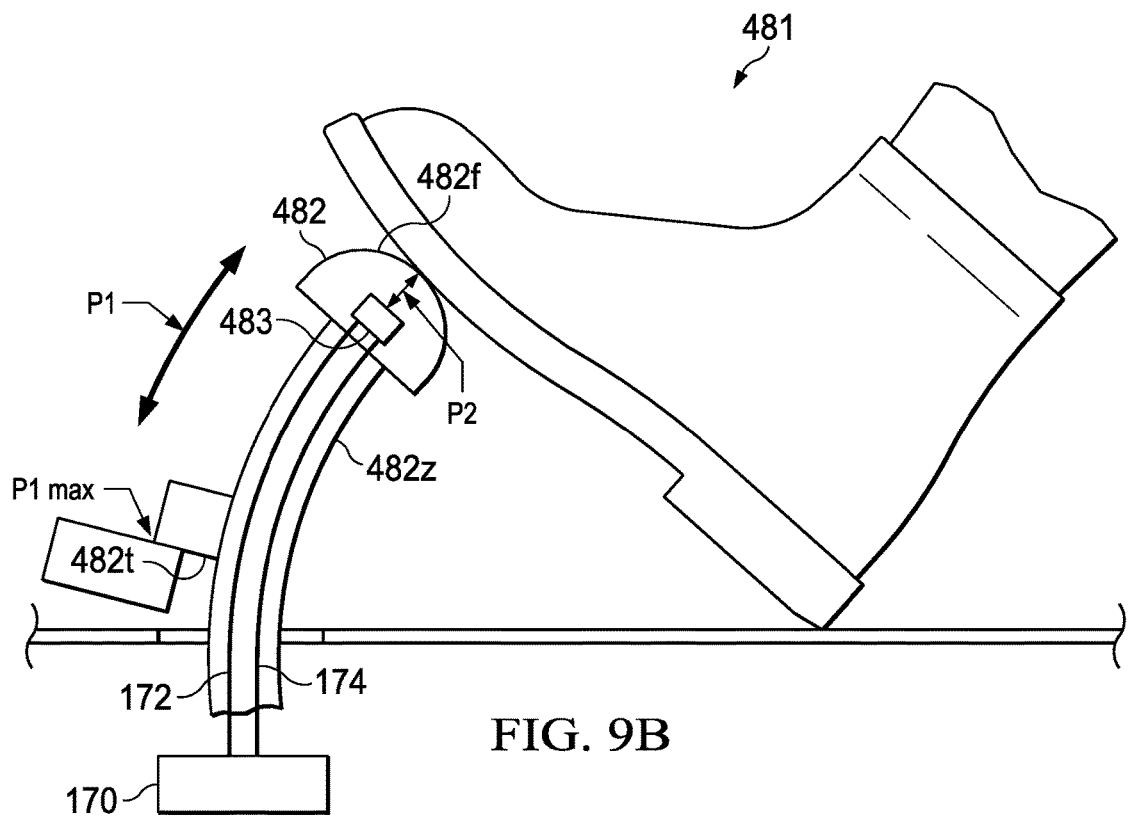
FIG. 9B is a schematic side view of a prior art pedal assembly.

FIG. 9B shows a schematic example embodiment of a pilot or co-pilot's pedal assembly 481. Certain components of the pedal assembly 481 are as described above in connection with the pedal assemblies 181, 381, except as noted herein. Those components bear similar reference characters to the components of the pedal assemblies 181, 381. The pedal assembly 481 includes a pedal 482, a pedal sensor 483 operably associated with the pedal 482, a pedal restraint 482*t*, and a pedal shaft 482*z*. The pedal 482 is disposed on the slidable shaft 482*z* and having the pedal restraint 482*t* to slide within a range of a first position P1 (e.g., see the P1 arrow). The pedal 482 is configured for sending a primary input 172 when in a first position P1. The pedal sensor 483 is disposed in and/or on the pedal 482 and configured to sense the first position P1 as well as configured to sense a depression in a pedal surface 482*f*. The pedal 482 slides upward and downward in the first position P1 (e.g., see the P1 arrow) when engaged by the foot of the user. When the pedal 482 is in a first position P1, the pedal sensor 483 is configured for sending a primary input 172.

FIG. 9B illustrates the pedal 482 in the maximum first position P1max such that the pedal 482 is restrained by the pedal restraint 482*t* (e.g., maximum rpm of the rotor blades 138 in the primary ducted rotor system 130). The maximum first position P1max indicates that the primary input 172 from the pedal 482 equals the first anti-torque force (T1) to be at the maximum force (e.g., maximum first anti-torque force from the primary ducted anti-torque system 130). If the pedal 482 is depressed further at the P1max position, the pedal surface 482*f* is displaced or otherwise depressed to a second position P2 to provide a secondary input 174 for controlling the second anti-torque force (T2) produced by the secondary ducted tail rotor system 140. In an embodiment, the displacement of the pedal 482 to the P1max position and the pedal surface 482*f* to the P2 position is a desired total anti-torque force (T3).

In some embodiments, the pedal 482 may be displaced but not fully to the restraint 482*t* such that first position P1 is less than the maximum first position P1max (e.g., see the P1 arrow). In an embodiment, when the pedal 482 is in a first position P1, the pedal surface 482*f* is not depressed, which results in only the primary ducted tail rotor system 130 providing the first-anti-torque force T1 (which equals the total anti-torque force T3).

Figure 9C:
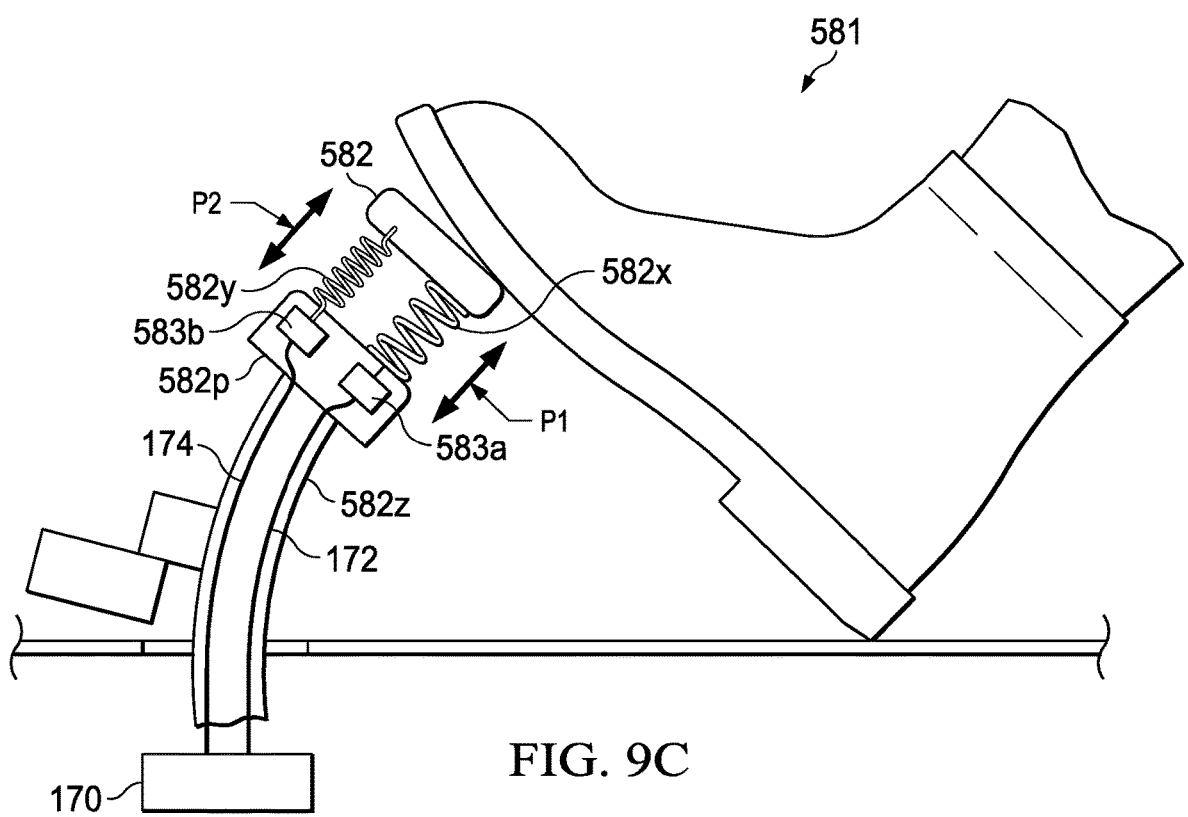
FIG. 9C is a schematic side view of an illustrative pedal assembly, according to an embodiment.

FIG. 9C shows a schematic example embodiment of a pilot or co-pilot's pedal assembly 581. Certain components of the pedal assembly 581 are as described above in connection with the pedal assemblies 181, 381, 481, except as noted herein. The pedal assembly 581 includes a pedal 582, a pedal support 582*p*, a primary resilient member 582*x*, a secondary resilient member 582*y*, a primary pedal sensor 583*a*, and a secondary pedal sensor 583*b*. The primary and secondary resilient members 582*x*, 582*y* are disposed between the pedal 582 and the pedal support 582*p*. In some exemplary embodiments, the primary and secondary resilient members 582*x*, 582*y* are each comprised of a deformable material such as a metal or a resin material. In an embodiment, the primary and secondary resilient members 582*x*, 582*y* are each a helical compression spring or the like (e.g., conical, constant rate, variable rate/variable pitch type springs) having a predetermined first and second compression load, respectively. In an embodiment, the primary resilient member 582*x* has a predetermined first compressive load more than the predetermined second compression load of the secondary resilient member 582*y*.

The pedal support 582*p* is disposed on a non-sliding shaft 582*z* (e.g., shaft 582*z* is shorter than sliding shaft 482*z*). The primary pedal sensor 583*a* is disposed in and/or on the pedal support 582*p* and configured to sense a depression and/or a change first compressive load of the primary resilient member 582*x* by the user, which is a first position P1. When the pedal 582 is in the first position P1 (e.g., the primary resilient member 582*x* is depressed or the primary compressive load changes in the primary resilient member 582*x*), the pedal sensor 583*a* is configured for sending a primary input 172. The secondary pedal sensor 583*b* is disposed in and/or on the pedal support 582*p* and configured to sense a depression and/or change in the second compressive load of the secondary resilient member 582*y* by the user, which is a second position P2. When the pedal 582 is in the second position P2 (e.g., the second resilient member 582*y* is depressed or the secondary compressive load changes in the secondary resilient member 582*y*), the pedal sensor 583*b* is configured for sending a secondary input 174. In an embodiment, the change in compression of the primary and/or secondary resilient members 582*x*, 582*y* indicates at least a desired change in the total anti-torque force (T3) comprised of a change in the first anti-torque force (T1) and/or a change in the second anti-torque force (T2), respectively.

An embodiment of the step 620 of method 600 is illustrated in FIG. 11 as an auxiliary loop 630. The auxiliary loop 630 is designed to determine a secondary output command that is transmitted in step 670 to the secondary ducted tail rotor system 140 to energize at least one ducted tail rotor assembly therein (e.g., at least one of e.g., first, second, and third ducted tail rotor assemblies 141*a*, 141*b*, 141*c*) to provide the second anti-torque force (T2) that is auxiliary (e.g., provides an increase in the total anti-torque force (T3) by the secondary ducted tail rotor system 140). For example, and not limitation, auxiliary loop 630 can be utilized during take-off and landing modes and/or in challenging environmental conditions (e.g., high winds).

The auxiliary loop 630 is utilized when the indication of a change in the operating condition comprises sensing a change in a pilot input by a pilot control (e.g., a primary input 633*a*, a secondary input 633*b* as described herein) and/or by a rotorcraft condition input. In an embodiment, a pilot input can be a pedal input as described herein using a pedal assembly 181, 381, 481, 581, for example, but not limitation. The control system 170 receives an indication of a change in a pilot input as a primary input 172 and a secondary input 174 (e.g., displacement of a pedal) and will determine a desired second anti-torque force T2 in step 646. Auxiliary loop 630 receives rotorcraft condition input from rotorcraft condition sensors to determine a current anti-torque system performance in step 634. In an embodiment, rotorcraft condition input can comprise at least one of the following: flight parameters 631*a*, environmental conditions 631*b*, density 631*c*, gross weight 631*d*, rotorcraft configuration 631*e*, airspeed 631*f*, altitude 631*g*, and location input 631*h*.

Auxiliary loop 630 in step 636 then determines a desired second anti-torque force based upon at least the secondary input generated from the displacement of the pedal by the user. In some embodiments, the step 636 is automatically determined by the FBW system.

Auxiliary loop 630 in step 638 then determines an appropriate action of the at least one ducted tail rotor assembly to achieve the desired amount of second anti-torque force T2 based upon the determined current anti-torque system performance and the determined desired second anti-torque force. The auxiliary loop 630 in step 639*a* determines and generates a secondary output command in accordance with the determined appropriate action from step 638. In some embodiments, the auxiliary loop 630 in step 639*b* determines and generates a primary output command in accordance with the determined appropriate action from step 638. Accordingly, the auxiliary loop 630 provides the ability to quickly modify variables by the control system 170. Advantageously, the auxiliary loop 630 limits energizing the secondary ducted tail rotor system 140 only for instances when a second anti-torque force T2 is needed, which conserves battery and electrical resources.

Figure 7:
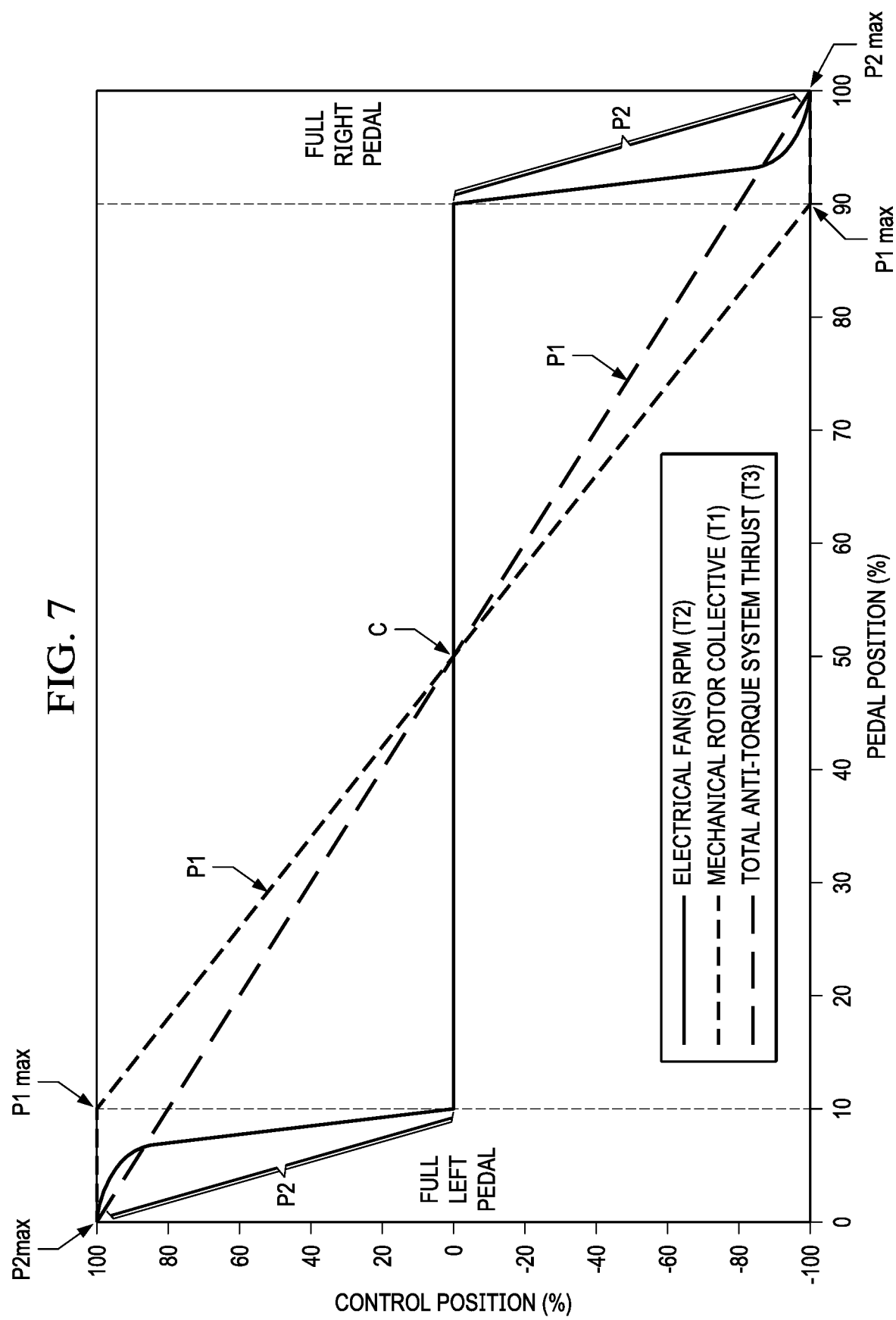
FIG. 7 is a schematic illustration of an exemplary pedal margin with the X axis representing pedal position displacement and the Y axis represents control position.

FIG. 7 is a graph illustrating the activation and determinations of auxiliary loop 630. For ease of explanation and not limitation, the pedal assembly 481 in FIG. 9B will be referenced in relation to FIG. 7. The center C of the diagram indicates a neutral pedal position at 50% with the collective as zero and no rpm. Then the user slides either the right or left pedal 482 downward to a first position P1 for sending a primary input 172, which ultimately activates the mechanical rotor collective (e.g., first anti-torque force T1) generated by the primary ducted rotor system 130. Once pedal 482 is stopped by restraint 482*t*, the maximum first position P1max (10% or 90% of pedal margin) is achieved and the maximum first anti-torque force T1 from the primary ducted anti-torque system 130 is generated. At least based on the change of the primary input 172, the auxiliary loop 630 determines the current anti-torque system performance as noted above in step 634. Then auxiliary loop 630 determines a desired second anti-torque force based on the secondary input in step 636. The appropriate action is then determined based upon the data in steps 634 and 636 to achieve the desired amount of second anti-torque force. For example, the determination of the secondary output command is configured to energize the at least one ducted tail rotor assembly 141 when the maximum first position P1max input occurs; for example, according to an embodiment the secondary output command is determined when the desired amount of total anti-torque force T3 is greater than or equal to the maximum first position P1max). Accordingly, when the mechanical rotor collective of the primary ducted tail rotor system 130 reaches P1max, the secondary output is determined to energize at least one ducted tail rotor assembly 141 in the secondary ducted tail rotor system 140 to provide the second anti-torque force.

In an embodiment, when the pedal is in the first position P1max, the user depresses the pedal surface 482*f* downward to a second position P2 (for example, as shown in FIG. 7) for sending a secondary input 174, which ultimately activates at least one ducted tail rotor assembly 141 in the secondary ducted tail rotor system 140. If the pedal surface 482*f* is depressed or otherwise to the bottom of P2, the maximum second position P2max is achieved and the maximum second anti-torque force T2 is generated from the at least one ducted tail rotor assembly 141 in the secondary ducted tail rotor system 140.

As shown in the exemplary embodiment in FIG. 7, the algorithm for the auxiliary loop 630 determination can be based upon pedal margin. For example, the tail rotor assemblies 141 will not operate when the primary ducted rotor 130 is at or below the maximum first position P1max (e.g., between 10-90% of the pedal margin as shown in FIG. 7), which is a majority of flight conditions. When the desired total anti-torque force is more than or about equal to the max first position P1max, the desired second anti-torque force is determined (e.g., when the pedal margin is greater than and/or equal to +/−10% of the pedal margin as shown in FIG. 7).

Advantageously, the auxiliary loop 630 determines the secondary output command and transmits the command in step 670 of method 600 to energize the electric power 162 to power at least one tail rotor assembly 141 in the secondary ducted tail rotor system 140 to produce the required second anti-torque force to land safely. In addition, the determinations of the auxiliary loop 630 can be configured based on the desired amount of second anti-torque force to gradually feather in the electric powered anti-torque force. Moreover, the auxiliary loop 630 can advantageously be configured to limit the use of the secondary ducted tail rotor 140 to save the electric power supply 162 for only limited circumstances (e.g., when the 100% mechanically powered primary ducted tail rotor 130 is insufficient for safe operating conditions).

An embodiment of the step 620 of method 600 is illustrated in FIG. 12 as a primary malfunction loop 640. The primary malfunction loop 640 is designed to determine a secondary output command that is transmitted in step 670 to the secondary ducted tail rotor system 140 to energize at least one ducted tail rotor assembly 141 therein to provide a backup second anti-torque force (T2) to achieve safe operation of rotorcraft 100 in the event of a malfunction, a pending malfunction, and/or loss of the primary ducted tail rotor system 130.

The primary malfunction loop 640 is utilized when the indication of a change in the operating condition of the anti-torque system comprises sensing a malfunction, a pending malfunction, and/or loss of the primary ducted rotor system 130 (e.g., a primary malfunction, a pending primary malfunction, and/or a primary loss of the primary ducted rotor system 130). A pending malfunction refers to a forthcoming malfunction of one or more components in the anti-torque system 120 (e.g., there is a change in an operating condition that indicates an approaching malfunction such as an over-temperature condition). In some embodiments, the primary malfunction loop 640 is automatically engaged upon receiving a change in an operating condition of anti-torque system. In an embodiment, the receiving an indication of a change of the anti-torque system comprises sensing a malfunction, a pending malfunction, and/or loss of the primary ducted tail rotor system by receiving a change in at least one of a rotorcraft condition input, a feedback input, and a pilot input, as described herein. In an embodiment, the change in the operating condition is an unplanned change (e.g., an unexpected malfunction or loss). In another embodiment, the change in the operating condition is a planned change (e.g., a malfunction or loss is predicted based on maintenance inputs and/or records and rotorcraft condition input).

The primary malfunction loop 640 receives rotorcraft condition input from rotorcraft condition sensors (e.g., rotorcraft condition sensors 184 as described herein) to determine a current primary ducted tail rotor system performance in step 644. In an embodiment, rotorcraft condition input can comprise at least one of the following: flight parameters 641a, environmental conditions 641b, density 641c, gross weight 641d, rotorcraft configuration 641e, airspeed 641f, altitude 641g, location input 641h, and tail rotor torque 641i (e.g., actual anti-torque produced by the anti-torque system 120).

In an embodiment, the primary malfunction loop 640 receives feedback input 642 from a feedback sensor associated with the primary ducted tail rotor system and/or the secondary ducted tail rotor system 140 to determine a current primary ducted tail rotor system 130 performance in step 644. In an embodiment, the feedback sensor 187 can comprise at least one primary ducted tail rotor sensor configured to detect and convey the operational status of the primary ducted tail rotor system 130 as described herein. In an embodiment, the feedback input 642 indicates a loss or malfunction of the primary ducted tail rotor system 130 (e.g., the rpm of the rotor blades 138 in the primary ducted rotor system 130 is incongruent with and/or less than an expected first anti-torque force T1 as controlled by the pilot input and/or the fly-by-wire system).

In an embodiment, the primary malfunction loop 640 receives a pilot input including at least a primary input 643a associated with the primary ducted tail rotor system 130 to determine a current primary ducted tail rotor system performance in step 644. In an embodiment, the primary input 643a is received by the control system 170 and is incongruent with the expected first anti-torque force T1, which is determined by the control system 170 to be a loss, a pending malfunction, and/or malfunction of the primary ducted tail rotor system 130. For example, the pilot may be able to detect a malfunction and/or complete loss of at the primary rotor system via the pilot controls (e.g., based upon the pedal position and yaw rate of the rotorcraft). In some embodiments, the pilot controls include the pedal assemblies described herein and configured such that the pilot can sense a malfunction and/or a complete loss of the primary ducted tail rotor system 130 (e.g., via a primary pedal member in the pedal assembly as described herein).

Primary malfunction loop 640 in step 646 then determines a desired second anti-torque force based upon at least the secondary input generated from the displacement of the pedal by the user. In some embodiments, the step 646 is automatically determined by the FBW system. The control system 170 receives an indication of a change in a pilot input as a primary input 172 and a secondary input 174 (e.g., displacement of a pedal) and will determine a desired second anti-torque force T2.

Primary malfunction loop 640 in step 648 then determines an appropriate action of the at least one ducted tail rotor assembly to achieve the desired amount of second anti-torque force T2 based upon the determined current primary ducted tail rotor system performance and the determined desired second anti-torque force. The primary malfunction loop 640 in step 649a determines and generates a secondary output command in accordance with the determined appropriate action from step 648.

In some embodiments, the primary malfunction loop 640 further includes the step of augmenting the second anti-torque force T2 provided by the at least one ducted tail rotor assembly to align (e.g., similar to) the second anti-torque force T2 with the desired second anti-torque force T2. The primary malfunction loop 640 determines a second output command that advantageously provides a redundant anti-torque force (e.g., second anti-torque force T2) that achieves stability during operation of rotorcraft 100 in the event of a loss, a pending malfunction, and/or malfunction of the primary ducted tail rotor system 130. In an embodiment, the desired second anti-torque force T2 is substantially equal to a total anti-torque force (T3).

In an embodiment, the primary malfunction loop 640 includes a step 649c of activating a primary disablement component in a primary control device to cause a partial or complete deactivation of the malfunctioning primary ducted tail rotor system 130.

Accordingly, the primary malfunction loop 640 provides the ability to quickly modify variables by the control system 170 to operate the rotorcraft 100 even in the event of a malfunction, a pending malfunction, and/or loss of the primary ducted tail rotor system 130. Advantageously, the primary malfunction loop 640 provides a method for energizing the secondary ducted tail rotor system 140 only in instances when a back-up anti-torque force is needed (e.g., the second anti-torque force T2), which conserves battery and electrical resources.

An embodiment of the step 620 of method 600 is illustrated in FIG. 13 as a secondary malfunction loop 650. The secondary malfunction loop 650 is designed to determine a secondary output command that is transmitted in step 670 to the secondary ducted tail rotor system 140 to energize at least one functioning ducted tail rotor assembly 141 therein to provide a backup second anti-torque force (T2) to achieve safe operation of rotorcraft 100 in the event of a loss, a pending malfunction, and/or malfunction of a ducted tail rotor assembly.

The secondary malfunction loop 650 is utilized when the indication of a change in the operating condition of the anti-torque system comprises sensing a malfunction, a pending malfunction, and/or loss of a ducted tail rotor assembly (e.g., one or more of first, second, third ducted tail rotor assemblies 141a, 141b, 141c' of the secondary ducted tail rotor system 140 as described herein) (e.g., a secondary malfunction, a pending secondary malfunction, and/or a secondary loss of the one or more of the secondary ducted rotor system tail rotor assemblies). In some embodiments, the secondary malfunction loop 650 is automatically engaged upon receiving a change in an operating condition of the anti-torque system. In an embodiment, the receiving an indication of a change of the anti-torque system comprises sensing a malfunction, a pending malfunction, and/or loss of a ducted tail rotor assembly in the secondary ducted tail rotor system by receiving a change in at least one of a rotorcraft condition input, a feedback input, and a pilot input, as described herein. In an embodiment, the change in the operating condition is an unplanned change (e.g., an unexpected malfunction or loss). In another embodiment, the change in the operating condition is a planned change (e.g., a malfunction or loss is predicted based on maintenance inputs and/or records and rotorcraft condition input).

The secondary malfunction loop 650 receives rotorcraft condition input from rotorcraft condition sensors (e.g., rotorcraft condition sensors 184 as described herein) to determine a current secondary ducted tail rotor system performance in step 654. In an embodiment, rotorcraft condition input can comprise at least one of the following: flight parameters 651a, environmental conditions 651b, density 651c, gross weight 651d, rotorcraft configuration 651e, airspeed 651f, altitude 651g, location input 651h, and tail rotor torque 651i (e.g., actual anti-torque produced by the anti-torque system 120).

In an embodiment, the secondary malfunction loop 650 receives feedback input 652 from a feedback sensor associated with the secondary ducted tail rotor system 140 to determine a current secondary ducted tail rotor system 140 performance in step 654. In an embodiment, the feedback sensor 187 can comprise at least one secondary ducted tail rotor sensor configured to detect and convey the operational status of the secondary ducted tail rotor system 140 as described herein. In an embodiment, the feedback input 652 indicates a loss, a pending malfunction, and/or malfunction of the secondary ducted tail rotor system 140 (e.g., the rpm of the rotor blades 148 in one or more of first, second, third ducted tail rotor assemblies 141a, 141b, 141c' is incongruent with and/or less than an expected second anti-torque force T2 as controlled by the pilot input and/or the fly-by-wire system). In an exemplary embodiment, the feedback input 652 includes identifying the inoperable or malfunctioning first, second, third ducted tail rotor assemblies 141a, 141b, 141c'.

In an embodiment, the secondary malfunction loop 650 receives a pilot input 653 including at least a secondary input 653b associated with the secondary ducted tail rotor system 140 to determine a current secondary ducted tail rotor system performance in step 654. In an embodiment, the secondary input 653b is received by the control system 170 and is incongruent with the expected second anti-torque force T2, which is determined by the control system 170 to be a loss or malfunction of the secondary ducted tail rotor system 140. For example, the pilot may be able to detect a malfunction and/or complete loss of at the secondary rotor system via the pilot controls (e.g., based upon the pedal position and yaw rate of the rotorcraft). In some embodiments, the pilot controls include the pedal assemblies described herein and configured such that the pilot can sense a malfunction and/or a complete loss of the secondary ducted tail rotor system 140 (e.g., via a secondary pedal member in the pedal assembly as described herein).

Secondary malfunction loop 650 in step 656 then determines a desired second anti-torque force based upon at least the secondary input generated from the displacement of the pedal by the user. In some embodiments, the step 656 is automatically determined by the FBW system. The control system 170 receives an indication of a change in a pilot input as a secondary input 174 (e.g., displacement of a pedal) and will determine a desired second anti-torque force T2.

Secondary malfunction loop 650 in step 658 then determines an appropriate action of the at least one ducted tail rotor assembly to achieve the desired amount of second anti-torque force T2 based upon the determined current secondary ducted tail rotor system performance and the determined desired second anti-torque force. The secondary malfunction loop 650 in step 659a determines and generates a secondary output command in accordance with the determined appropriate action from step 658.

In some embodiments, the secondary malfunction loop 650 further includes the step of augmenting the second anti-torque force T2 provided by the at least one functioning ducted tail rotor assembly (e.g., the ducted tail rotor assembly not associated with the malfunction, a pending malfunction, and/or loss; functioning means the ducted tail rotor is operable to achieve the secondary output command) to align the second anti-torque force T2 with the desired second anti-torque force T2. For example, in some embodiments a first and second ducted tail rotor assemblies 141a, 141b each produce a portion T2a, T2b, respectively, of the second anti-torque force T2 (e.g., T2a+T2b=T2). However, if the first ducted tail rotor assembly is malfunctioning or inoperable (e.g., T2a=zero), then the anti-torque force of the functioning ducted tail rotor assembly, e.g., the second ducted tail rotor assembly 141b in this example, is augmented to maintain the desired second anti-torque force T2 (e.g., T2b=T2). In other embodiments, the anti-torque force for other functioning tail rotor assemblies may be augmented (e.g., increased slightly so that they cumulatively achieve T2 so as to not rely solely on one functioning tail rotor assembly 141). The secondary malfunction loop 650 determines a second output command that advantageously provides a redundant secondary anti-torque force (e.g., the functioning tail rotor assemblies are controlled to achieve the desired secondary anti-torque force T2) that achieves stability during operation of rotorcraft 100 in the event of a malfunction, a pending malfunction, and/or loss of a tail rotor assembly in the secondary ducted tail rotor system 140. In an embodiment, the desired second anti-torque force T2 is substantially equal to a total anti-torque force (T3).

In an embodiment, the secondary malfunction loop includes a step 659d of activating a secondary disablement component in a secondary control device to cause a partial or complete deactivation of the malfunctioning tail rotor assembly in the secondary ducted tail rotor system 140.

Accordingly, the secondary malfunction loop 650 provides the ability to quickly modify variables by the control system 170 to operate the rotorcraft 100 in the event of a malfunctioning, a pending malfunction, and/or loss of a tail rotor assembly 141 in the secondary ducted tail rotor system 140. Advantageously, the secondary malfunction loop 650 provides a method for energizing at least one functioning tail rotor assembly in the secondary ducted tail rotor system 140 when needed, which conserves battery and electrical resources.

An embodiment of the step 620 of method 600 is illustrated in FIG. 14 as an acoustic signature loop 660. The acoustic signature loop 660 is designed to determine a secondary output command that is transmitted in step 670 to the secondary ducted tail rotor system 140 to energize at least one functioning ducted tail rotor assembly 141 therein to achieve a desired acoustic signature of the anti-torque system 120. In some embodiments, the acoustic signature loop 660 further determines a primary output command that is transmitted in step 670 to the primary ducted tail rotor system 130 to control the operation thereof to achieve the desired acoustic signature of the anti-torque system 120. In an embodiment, the desired acoustic signature is a muted sound of at least one of the primary ducted tail rotor system 130 and the secondary ducted tail rotor system 140.

The acoustic signature loop 660 is utilized when the indication of a change in the operating condition of the anti-torque system comprises determining a noise-sensitive area. In some embodiments, the acoustic signature loop 660 is automatically engaged upon receiving a change in an operating condition of the anti-torque system (e.g., when determined that the rotorcraft is in or near a noise-sensitive area). In an embodiment, the determining a noise-sensitive area is based on at least one of a rotorcraft condition input, a feedback input, and a pilot input, as described herein.

The acoustic signature loop 660 receives rotorcraft condition input from rotorcraft condition sensors (e.g., rotorcraft condition sensors 184 as described herein) to determine a current anti-torque system acoustic signature in step 664. In an embodiment, rotorcraft condition input can comprise at least one of the following: flight parameters 661a, environmental conditions 661b, density 661c, gross weight 661d, rotorcraft configuration 661e, airspeed 661f, altitude 661g, and location input 661h. In an exemplary embodiment, the rotorcraft condition input comprises only altitude 661g and location input 661h.

In an embodiment, the acoustic signature loop 660 receives feedback input 662 from a feedback sensor associated with each of the primary and secondary ducted tail rotor systems 130, 140 to determine the current acoustic signature of the anti-torque system in step 664. In an embodiment, the feedback sensors 187 can comprise at least one secondary ducted tail rotor sensor 149 configured to detect and convey the operational status (e.g., sensing vibrations thereof) of the secondary ducted tail rotor system 140 as described herein. In an embodiment, the feedback sensors 187 can comprise at least one primary ducted tail rotor sensor 139 configured to detect and convey the operational status (e.g., sensing vibrations thereof) of the primary ducted tail rotor system 140 as described herein. In an embodiment, step 664 is determined only from the feedback input (e.g., not including the rotorcraft condition input and pilot input).

In an embodiment, the acoustic signature loop 660 receives a pilot input including at least a primary input 663a and a secondary input 663b associated with the secondary ducted tail rotor system 140 to determine the current anti-torque acoustic system acoustic signature in step 664.

Acoustic signature loop 660 further includes a step 665 of determining if the rotorcraft 100 is in or near a noise-sensitive area. The noise-sensitive area is determined by at least one of the following: current location, altitude, and flight path of rotorcraft 100. In an embodiment, the step 665 is based only on rotorcraft condition inputs, namely, only the inputs of altitude 661g and location input 661h. It may be determined in step 665 that the rotorcraft 100 is not in or near a noise-sensitive area, which will cause the acoustic signature loop 660 to not implement with any further steps (e.g., it will not proceed to steps 668, 669 such as steps 669a, 669b). Oftentimes the rotorcraft 100 is not in or near a noise-sensitive area when in a cruise mode. The determination of an "in or near" a noise-sensitive area often occurs when rotorcraft 100 is operating in a hover hold, take-off, and/or landing mode as well as during military, security, and/or police missions.

Acoustic signature loop 660 then includes a step 666 of determining a desired acoustic signature. In some embodiments, the step 666 is automatically determined by the FBW system. The control system 170 receives an indication of a change that comprises determining a noise-sensitive area and then will determine a desired acoustic signature based on the location and altitude of the noise-sensitive area as well as the rotorcraft 100 configuration (e.g., the anti-torque system 120 configuration).

In an embodiment, the desired acoustic signature is determined based upon a predetermined acoustic signature in step 666a. The predetermined signature can be selected from a database having a plurality of predetermined acoustic signatures that can be selected by prioritizing a characteristic of the predetermined acoustic signature. The plurality of predetermined acoustic signatures can include a desired signature (e.g., having a predetermined phase, amplitude/or, and frequency), a location determinative predetermined acoustic signature (e.g., a predetermined acoustic signature is implemented in loop 660 when rotorcraft is in or near a particular location associated with the predetermined acoustic signature), and a predetermined acoustic signature for a mission and/or flight path. Each predetermined acoustic signature can include a predetermined primary output command and/or a predetermined secondary output command.

Acoustic signature loop 660 in step 668 then determines an appropriate action of the at least one ducted tail rotor assembly to achieve the desired acoustic signature, which is based upon the determinations from steps 664, 665, and 666 described herein. The acoustic signature loop 660 further includes a step 669a that determines and generates a secondary output command in accordance with the determined appropriate action from step 668. The acoustic signature loop 660 further includes a step 669b that determines and generates a primary output command in accordance with the determined appropriate action from step 668.

In an exemplary embodiment of determining an appropriate action, the secondary output is generated and transmitted to energize the secondary tail rotor system 140 and the collective of the primary tail rotor system 130 is reduced. In an embodiment, the rpm and/or the collective of the blades 148 of the secondary ducted tail rotor system 140 are increased by the secondary output command while the rpm and/or the collective of the blades 138 of the primary ducted tail rotor system 130 are decreased by the primary output command.

In some embodiments, the acoustic signature loop 660 includes sending an acoustic signature output to an output interface 190 including at least one of a current acoustic signature display 195 and a desired acoustic signature display 196. The current and desired acoustic signature displays 195, 196 can be used by the pilot and/or user to determine whether the desired acoustic signature has been achieved. If the current acoustic signature display indicates that the current acoustic is more than the desired acoustic signature, then the pilot and/or user may determine to change the flight path (e.g., slow down, change direction, change altitude) to avoid approaching the noise-sensitive area prior to reaching the desired acoustic signature.

In an alternate embodiment of steps in the acoustic loop 660, the control system 170 receives a pilot input including at least a primary input 663a and a secondary input 663b from the pilot input 663 which is transmitted directed to steps 669a, 669b, respectively. In this embodiment, the pilot could use a pedal assembly as described herein to generate the primary and secondary inputs 663a, 663b to directly control the secondary output command and primary output commands, respectively. For example, the displacement of a second pedal member or another pilot control (e.g., a noise-sensitive switch) determines the secondary output command and energizes the secondary ducted tail rotor system 140 to turn on to a noise-sensitive mode. In some embodiments, this would be a noise-sensitive operation of the secondary ducted tail rotor system that could include a low RPM and/or reduced collective of blades 148 of the secondary ducted tail rotor system 140. The pilot and/or user could adjust the primary pedal member position and/or switch to reduce the RPM and/or reduced collective of blades 138 of the primary ducted tail rotor system 130, and, in some embodiments, completely turn off the primary ducted tail rotor system 130. Accordingly, this embodiment permits control of the acoustic signature loop 660 to achieve a desired acoustic signature (e.g., the anti-torque system 120 produces less noise).

The acoustic signature loop 660 advantageously allow the anti-torque system 120 to operate with a controlled acoustic signature (e.g., a lower noise tail rotor and/or a desired acoustic signature) in noise-sensitive areas.

The anti-torque systems and methods relating thereto detailed above provide at least one of the following advantages: improved reliability of the rotorcraft; improved safety of the rotorcraft; different power sources for the primary and secondary ducted tail rotor systems, which provides redundant power systems for the anti-torque system; reduced size of the primary ducted tail rotor system; and quieter operation of the rotorcraft. In some embodiments, the secondary ducted tail rotor system is used only for emergency use (e.g., when a supplement anti-torque force is needed more than P1max, when there is a loss, a pending malfunction, or malfunction of the primary and/or secondary ducted tail rotor systems. The systems and methods described herein are configured such that in some embodiments, the blades and components in the primary ducted tail rotor system 130 are smaller and lighter weight in the anti-torque system 120 as compared to a conventional shrouded tail rotor (e.g., since supplemental anti-torque force T2 is provided the lighter weight secondary ducted tail rotor system 140). The systems and methods described herein are configured such that in some embodiments, e.g. the electrically powered secondary ducted tail rotor system 140 is activated in only limited circumstances (e.g., the loops 630, 640, 650, 660) to conserve electrical power so that other electrically power system (e.g., control system, air condition, etc.) can be powered during operation of the rotorcraft 100. Some of the systems and method described herein advantageously allow the anti-torque system 120 to operate with a controlled acoustic signature (e.g., a lower noise tail rotor and/or a desired acoustic signature).

The terms "a" and "an" are defined as one or more unless this disclosure explicitly requires otherwise.

The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Terms such as "primary", "secondary", "first", "second", "third", and "fourth" are used only to differentiate features and not to limit the different features to a particular order or to a particular quantity.

Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Any numerical range defined by two R numbers as defined in the above is also specifically disclosed and includes the two R numbers.

Use of the term "optionally" with respect to any element of a claim means that the element is required, or alternatively, the element is not required, both alternatives being within the scope of the claim.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

The same or similar features of one or more embodiments are sometimes referred to with the same reference numerals within a figure or among figures. However, one or more features having the same reference numeral should not be construed to indicate that any feature is limited to the characteristics of another feature having the same reference numeral, or that any feature cannot already have, or cannot be modified to have, features that are different from another feature having the same reference numeral.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A method of providing an anti-torque force in a rotorcraft; the rotorcraft having an anti-torque system comprised of a primary ducted tail rotor system mechanically connected to an engine and configured to provide a first anti-torque force on the body of the rotorcraft, and a secondary ducted tail rotor system electrically connected to an electric power supply and configured to provide a second anti-torque force on the body of the rotorcraft; the method comprising:
  receiving an indication of a change in the operating condition of the anti-torque system based upon a change in at least one of the following: a rotorcraft condition input from a rotorcraft condition sensor, a feedback input from at least one feedback sensor associated with a primary ducted tail rotor system and/or a secondary ducted tail rotor system, and a pilot input from at least one pilot control;
  responsive to the indication of the change in the operating condition of the anti-torque system, determining, by a control system, an anti-torque control input including at least a secondary output command for controlling the secondary ducted tail rotor system; and
  transmitting the secondary output command to the secondary ducted tail rotor system to energize at least one ducted tail rotor assembly therein to provide the second anti-torque force
  wherein the change in the operating condition comprises determining that the rotorcraft is in a noise-sensitive area,
  the method further comprising:
  the step of determining an anti-torque control input achieved by implementing an acoustic signature loop to generate:
    a primary output command for controlling the primary tail rotor system and the secondary output command to achieve a desired acoustic signature of the anti-torque system based upon a predetermined acoustic signature, and
  wherein the determining of a noise-sensitive area and a current anti-torque system acoustic signature are each based upon at least one of the following:
    the rotorcraft condition input,
    a feedback input, and/or
    the pilot input,
    which is then used to determine an appropriate action of the at least one ducted tail rotor assembly to achieve the desired acoustic signature;
  wherein the secondary output command is determined and generated in accordance with the determined appropriate action of the at least one ducted tail rotor assembly.

2. The method according to claim 1, replaced with wherein the step of determining an anti-torque control input including at least a secondary output command is determined by at least another one of the following: an auxiliary loop, a primary malfunction loop, and a secondary malfunction loop.

3. The method according to claim 1, wherein the control system is a fly-by-wire flight system.

4. The method according to claim 1, wherein the at least one pilot control comprises a pedal assembly including a pedal and a pedal sensor operably associated with the pedal and configured to detect displacement of the pedal; wherein the indication of a change in the operating condition comprises sensing displacement of the pedal by the pedal sensor.

5. The method according to claim 4, wherein the pedal is configured to be positioned to a first position to indicate a change in the operating condition of the primary ducted tail rotor system and a second position to indicate a change in the operating condition in the secondary ducted tail rotor system.

6. The method according to claim 4, the method further comprising:
  the step of determining an anti-torque control input including at least the secondary output command is achieved by implementing an auxiliary loop to generate the secondary output command.

7. The method according to claim 6, wherein the auxiliary loop determines a current anti-torque system performance based on rotorcraft condition input from the rotorcraft condition sensors and determines a desired second anti-torque force based upon the displacement of the pedal, which are then used to determine an appropriate action of the at least one ducted tail rotor assembly to achieve the desired amount of second anti-torque force;
  wherein the secondary output command is determined and generated in accordance with the determined appropriate action of the at least one ducted tail rotor assembly.

8. The method according to claim 1, wherein the change in the operating condition comprises sensing a malfunction, a pending malfunction, or loss of the primary ducted tail rotor system, the method further comprising:
  the step of determining an anti-torque control input including at least the secondary output command is achieved by implementing a primary malfunction loop to generate the secondary output command.

9. The method according to claim 8, wherein the primary malfunction loop determines a primary ducted tail rotor system performance and determines a desired second anti-torque force based upon the rotorcraft condition input, a feedback input, and/or the pilot input, which is then used to determine an appropriate action of the at least one ducted tail rotor assembly to achieve the desired second anti-torque force;
  wherein the secondary output command is determined and generated in accordance with the determined appropriate action of the at least one ducted tail rotor assembly.

10. The method according to claim 1, wherein the secondary ducted tail rotor system comprises a first ducted tail rotor assembly and a second ducted tail rotor assembly, wherein the change in operating condition is comprised of sensing a malfunction, a pending malfunction, or loss of the first or second ducted tail rotor assembly, the method further comprising:
  the step of determining an anti-torque control input including at least the secondary output command is achieved by implementing a secondary malfunction loop to generate the secondary output command for controlling a functioning first or second ducted tail rotor assembly.

11. The method according to claim 10, wherein the secondary malfunction loop determines a current secondary ducted tail rotor system performance and determines a desired second anti-torque force based upon the rotorcraft condition input, a feedback input, and/or the pilot input, which is then used to determine an appropriate action of the functioning first or second ducted tail rotor assembly to achieve the desired amount of second anti-torque force;
  wherein the secondary output command is determined and generated in accordance with the determined appropriate action of the functioning first or second ducted tail rotor assembly.

12. The method according to claim 10, further comprising:
augmenting the second anti-torque force provided by the functioning first or second ducted tail rotor assembly to align the second anti-torque force provided by the functioning first or second ducted tail rotor assembly with the desired anti-torque system performance.

13. The method according to claim 1, wherein the step of determine an appropriate action further comprises determine an appropriate action of the primary ducted tail rotor system to achieve the desired acoustic signature and generate a primary output command in accordance with the determined appropriate action of the primary ducted tail rotor system.

14. The method according to claim 13, wherein when entering a noise-sensitive area, the secondary output command increases a rpm and/or a collective of the blades in at least one ducted tail rotor assembly in the secondary ducted tail rotor system and the primary output command decreases an rpm and/or a collective of the blades in the primary ducted tail rotor system.

15. The method according to claim 1, wherein the acoustic signature loop further comprises sending an acoustic signature output including at least one of a current acoustic signature display and a desired acoustic signature display to an output interface.

16. The method according to claim 1, wherein the desired acoustic signature is selected from a database having a plurality of predetermined acoustic signatures.

17. The method according to claim 1, wherein the acoustic signature loop is automatically implemented when the rotorcraft is in or near a noise-sensitive area.

18. The method according to claim 1, wherein the determining of a noise-sensitive area and the desired acoustic signature is based on the pilot input including a primary input and a secondary input, which is then directly transmitted to the control system for determining at least a secondary output command and a primary output command.

\* \* \* \* \*